US007999484B2

(12) United States Patent
Jurngwirth et al.

(10) Patent No.: US 7,999,484 B2
(45) Date of Patent: *Aug. 16, 2011

(54) METHOD AND APPARATUS FOR CONTROLLING CURRENT SUPPLIED TO ELECTRONIC DEVICES

(75) Inventors: Paul Jurngwirth, Burnaby (CA); Shane P. Robinson, Gibsons (CA); Craig Matza, North Delta (CA)

(73) Assignee: Koninklijke Philips Electronics N.V., Eindhoven (NL)

( * ) Notice: Subject to any disclaimer, the term of this patent is extended or adjusted under 35 U.S.C. 154(b) by 280 days.

This patent is subject to a terminal disclaimer.

(21) Appl. No.: 12/158,019

(22) PCT Filed: Dec. 20, 2006

(86) PCT No.: PCT/CA2006/002068
§ 371 (c)(1),
(2), (4) Date: Sep. 16, 2008

(87) PCT Pub. No.: WO2007/071033
PCT Pub. Date: Jun. 28, 2007

(65) Prior Publication Data
US 2009/0134817 A1    May 28, 2009

Related U.S. Application Data

(60) Provisional application No. 60/819,783, filed on Jul. 10, 2006, provisional application No. 60/752,740, filed on Dec. 20, 2005.

(51) Int. Cl.
*H05B 41/16* (2006.01)

(52) U.S. Cl. ............... 315/247; 315/185 S; 315/291; 315/312; 315/224

(58) Field of Classification Search .......... 315/247, 315/246, 224, 225, 185 S, 291, 297, 307–326
See application file for complete search history.

(56) References Cited

U.S. PATENT DOCUMENTS

| 4,001,667 | A | 1/1977 | Bober |
| 6,362,578 | B1 | 3/2002 | Swanson et al. |
| 6,586,890 | B2 | 7/2003 | Min et al. |
| 6,734,639 | B2 | 5/2004 | Chang et al. |
| 7,202,608 | B2* | 4/2007 | Robinson et al. ............. 315/224 |
| 7,235,899 | B2* | 6/2007 | Otake ............................. 307/82 |
| 2004/0036418 | A1 | 2/2004 | Rooke et al. |
| 2004/0201988 | A1 | 10/2004 | Allen |
| 2004/0251854 | A1 | 12/2004 | Matsuda et al. |
| 2006/0279228 | A1* | 12/2006 | Kato ............................. 315/193 |
| 2007/0115248 | A1* | 5/2007 | Roberts et al. ............... 345/102 |
| 2007/0159421 | A1* | 7/2007 | Peker et al. .................... 345/82 |

* cited by examiner

FOREIGN PATENT DOCUMENTS

WO    2005082455 A1    9/2005

*Primary Examiner* — Tuyet Thi Vo

(57) ABSTRACT

The present invention provides a drive and control apparatus provides a desired switched current to a load including a string of one or more electronic devices. A voltage conversion means, based on an input control signal converts the magnitude of the voltage from the power supply to another magnitude that is desired at the high side of the load. A dimming control means provides control for activation and deactivation of the load and may further provide a means for current limiting. A feedback means is coupled to the voltage conversion means and a current sensing means and provides a control signal to the voltage conversion means that is indicative of voltage drop across the current sensing means which represents the current flowing through the load. Based on the control signal received, the voltage conversion means can subsequently adjust its output voltage such that a constant switched current is provided to the load.

20 Claims, 20 Drawing Sheets

METHOD AND APPARATUS FOR CONTROLLING CURRENT SUPPLIED TO ELECTRONIC DEVICES

FIELD OF THE INVENTION

The present invention pertains to the field of control of electronic devices, and in particular to a method and apparatus for switched drive current control of electronic devices.

BACKGROUND

Recent advances in the development of semiconductor light-emitting diodes (LEDs) and organic light-emitting diodes (OLEDs) have made these devices suitable for use in general illumination applications, including architectural, entertainment, and roadway lighting, for example. As such, these devices are becoming increasingly competitive with incandescent, fluorescent, and high-intensity gas discharge lamps.

The amount of light emitted by an LED under operating conditions directly depends on the electronic current that flows through the device. Because of variations in device characteristics, the same device current can lead to perceivable different luminous flux output under certain operating conditions even when the LEDs are of the same kind. When the drive current of a series connection of LEDs is reduced below a certain limit, some LEDs can completely stop emitting light before others do which can result in an undesired mode of operation. Effects such as this are largely a result of fluctuations in forward voltage characteristics across different LEDs. The limits for tolerable luminous flux output variations across LEDs usually depend on the kind of lighting application. The LED characteristics typically should be closely matched when the lighting application requires more than one LED to be able to keep the drive circuit design as simple as possible. Several drive circuit designs have been suggested that can efficiently control the LED drive current. Most designs belong to a category of linear constant current drive circuits that can maintain a uniform drive current through a serial connection of LEDs. However, many linear constant current drive circuits incur high power losses and require special power electronic devices and diligent thermal management. Most direct current or switched current drive circuits require complicated feedback control systems to enable accurate and reliable luminous flux output control if a wide range of operating conditions including low fractional nominal light output is desired.

Other solutions to effectively control LEDs require a Buck-boost regulator generating a regulated common voltage supply, low-side ballast resistors to set the LED drive current, and shunt resistors for current monitoring. For example, U.S. Pat. No. 6,362,578 discloses how to use biasing resistors for current control and a voltage converter with a feedback loop to maintain a constant voltage across an array of LEDs. An additional transistor is connected on the low side of the LEDs and is switched using pulse width modulation (PWM) for luminous flux output control. This drive circuit has high power losses due to the biasing resistors and the biasing resistors can require costly calibration to provide accurate current control. In addition, U.S. Pat. No. 4,001,667 discloses a closed loop circuit that provides a train of constant current pulses to light-emitting diodes for luminous flux output control. This closed loop circuit however, does not enable full range current pulse duty factor control.

U.S. Pat. No. 6,586,890 discloses a method that uses a current feedback system to adjust power to LEDs in which a low frequency PWM control signal drives a power supply. This method however, uses PWM switching frequencies of 20 Hz to 20 kHz which generate audible noise and can detrimentally affect the LEDs by thermally cycling the LED dies which consequently reduces reliability and lifetime of the devices.

U.S. Pat. No. 6,734,639 discloses a method for limiting excess drive current transients of a switched drive circuit for LED arrays by means of a voltage converter combined with a customized sample-and-hold drive circuit. The LED drive signal is linked to a biased switching signal for repetitively turning ON and OFF the voltage converter to switch both the load and the power supply simultaneously. This method however, can only be applied to fly-back and push-pull type voltage converters and cannot control the LED drive current directly. This method does not significantly reduce drive circuit power loss or improve overall system efficiency. In addition, this method typically only works within desired parameters up to drive frequencies of the order of 400 Hz and does not allow for high frequency switching. Consequently, a drive circuit according to this method can generate undesirable audible noise and may impose excessive thermal stress on the connected LED arrays.

Moreover, U.S. Patent Application No. 2004/0036418 discloses a method for driving LED arrays in which a converter is used to vary the current through the LEDs. A current switch is implemented to provide feedback. This method incorporates essential elements of a standard Buck converter design, however it is not able to control parallel LED strings which require different forward voltages. This method discloses how to use high-side transistor switches as variable resistors to limit the current per LED string, however high-side transistor switches can induce large power losses and decrease the overall efficiency of the drive circuit.

Power Integrations Inc. provides analog integrated circuits which can effectively and efficiently control LEDs. Power Integrations have disclosed a power conversion technology called eDI-92 that only requires a minimum number of components and is particularly designed for low-energy consumption lighting applications, for example emergency exit or night light signs. However, this solution does not provide for dimming, a switching capability of the load, or a means for controlling the peak load current for instances where the voltage converter is switched.

Furthermore, austriamicroystems AG, offers a high performance analog integrated circuit AS3691 that can be used to control between one and four LEDs at drive currents of up to about 1.6 A in a single LED configuration and 400 mA for each LED in a four LED configuration. The AS3691 provides a very specific design of a voltage converter feedback circuit that can limit the output voltage of the voltage converter. This converter control chip however, does provide a means for maintaining a voltage adjustment for LED strings, with the possibility of digital switching for dimming. This chip uses internal current limiting over all duty cycles to ensure that the peak load current never exceeds a desired set point. This approach can result in lower overall system efficiency. This inefficiency may worsen at switching frequencies higher than a few hundred Hertz, as there is no provision for maintaining the voltage set point during the OFF period and therefore the internal current limiting circuitry would need to be active over most duty cycles. In addition this control chip does not allow for efficient drive of LEDs with a wide range of forward voltages, but typically requires to be tuned for each LED or string thereof by means of external resistors.

In addition, FIG. 1 illustrates a representation of the relative current that may flow through a load in a circuit in which the voltage converter is switched. The rise time 111 and fall time 112 of the current is directly related to the speed with which a switching voltage converter can change the current supplied to the load. For example, when this procedure is used for the activation of LEDs, the light output of the LED during the transition periods, for example rise and fall times, may not be at the desired level and therefore may result in variations in the light output, which may be readily apparent during low duty cycles, for example.

Therefore, there is a need for an apparatus and method for effective control and light-emitting element drive current electronic circuit design that overcomes problems identified in the prior art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for controlling current supplied to electronic devices. In accordance with one aspect of the present invention there is provided a drive and control apparatus for controlling current supplied to a string of one or more electronic devices, the apparatus comprising: a voltage converter configured to receive a first magnitude voltage from a power supply, the voltage converter configured to convert the first magnitude voltage to a second magnitude voltage in response to a control signal; a dimming control means configured to receive the second magnitude voltage and a dimming control signal, the dimming control means configured to control transmission of the second magnitude voltage to the string based on the dimming control signal, the dimming control means configured for multi-mode operation, wherein the dimming control signal is indicative of a desired mode of operation of the dimming control means; a current sensing means in series with the string and configured to generate a feedback signal indicative of current flowing through the string; and a feedback means electrically coupled to the voltage converter and current sensing means, the feedback means configured to receive the feedback signal and generate the control signal based on the feedback signal, the feedback means further configured to provide the control signal to the voltage converter.

In accordance with another aspect of the present invention, there is provided a method for controlling current supplied to a string of one or more electronic devices, the method comprising the steps of: sampling current flowing through the string; adaptively converting voltage from a first magnitude voltage to second magnitude voltage in response to a feedback signal indicative of the sampled current; controlling provision of the second magnitude voltage to the string based on a dimming control signal, wherein the controlling is adaptively modified based on the dimming control signal.

DETAILED DESCRIPTION OF THE INVENTION

Definitions

Figure 1:
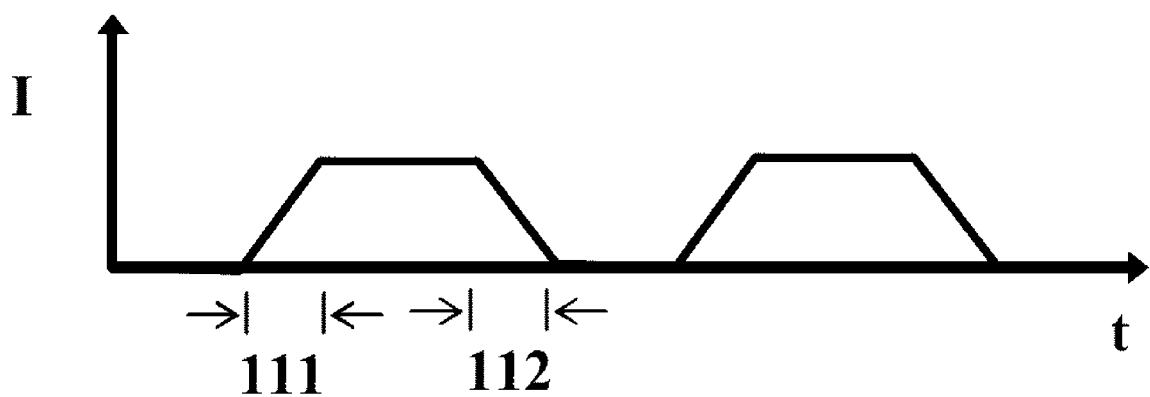
FIG. 1 illustrates a representation of the time dependence of the drive current for a load wherein switching is performed at the voltage converter as is performed in the prior art.

The term "power supply" is used to define a system comprising an input and an output for transforming a first form of electricity provided at the input, conditioning the first form of electricity into a second form of electricity, and providing the second form of electricity at the output. A power supply can accept a predetermined range of forms of electricity at the input and can condition the electricity into and provide a predetermined range of forms of electricity at the output.

The term "voltage converter" is used to define a system comprising an input and an output that can convert an input voltage of a first magnitude into an output voltage of a second magnitude, wherein the first and the second magnitude can be the same or different.

The term "electronic device" is used to define any apparatus whose level of operation is dependent on the form of supplied electricity. Examples of electronic devices include light-emitting elements, servo motors, and other devices requiring regulation of the form of the supplied electricity as would be readily understood by a worker skilled in the art.

The term "light-emitting element" is used to define a device that emits radiation in any region or combination of regions of the electromagnetic spectrum for example, the visible region, infrared and/or ultraviolet region, when activated by applying a potential difference across it or passing a current through it, for example. Therefore a light-emitting element can have monochromatic, quasimonochromatic, polychromatic or broadband spectral emission characteristics. Examples of light-emitting elements include semiconductor, organic, or polymer/polymeric light-emitting diodes, blue or UV pumped phosphor coated light-emitting diodes, optically pumped nanocrystal light-emitting diodes or other similar devices as would be readily understood by a worker skilled in the art. Furthermore, the term light-emitting element is used to define the specific device that emits the radiation, for example a LED die, and can equally be used to define a combination of the specific device that emits the radiation together with a housing or package within which the specific device or devices are placed.

The term "string" is used to define a multiplicity of electronic devices connected in series or parallel or a series-parallel combination. For example, a string of electronic devices may refer to more than one of the same or different electronic devices which can all be activated simultaneously by applying a voltage across the entire string thus causing them all to be driven with the same current as would be readily understood by a worker skilled in the art. A parallel string may refer to, for example, N electronic devices in M rows with each row being connected in parallel such that all of the N×M electronic devices can be activated simultaneously by applying a voltage across the entire string causing all N×M electronic devices to be driven with ~1/M of the total current delivered to the entire string.

The term "load" is used to define one or more electronic devices or one or more strings of electronic devices to which to which power is being supplied.

The terms "duty cycle" and "duty factor" are used interchangeably to define the ratio of the ON time to the time period, when having reference to digital switching, for example, pulse width modulation (PWM) which has a time period.

As used herein, the term "about" refers to a +/−10% variation from the nominal value. It is to be understood that such a variation is always included in any given value provided herein, whether or not it is specifically identified.

Unless defined otherwise, all technical and scientific terms used herein have the same meaning as commonly understood by one of ordinary skill in the art to which this invention belongs.

The present invention provides a drive and control apparatus and method for use with electronic devices in which a constant current flowing therethrough is desired, in addition to electronic devices that may require a control signal for operation. For example, the method and apparatus according to the present invention can be used to provide a switched constant current source to one or more light-emitting elements controlled using a Pulsed Width Modulation (PWM) signal, Pulsed Code Modulation (PCM) signal or other digital control method known in the art. The present invention further provides a method and apparatus for providing switched constant current sources to a plurality of electronic devices that have different forward voltages. For example, when multiple strings of one or more light-emitting elements are to be powered by a single power supply, the present invention can provide specific voltages at the high side of each string of light-emitting elements and a switched constant current through each of the strings.

The drive and control apparatus according to the present invention provides a desired switched current to a load including a string of one or more electronic devices, and comprises one or more voltage conversion means, one or more dimming control means, one or more feedback means and one or more sensing means. The voltage conversion means, based on an input control signal converts the magnitude of the voltage from the power supply to another magnitude that is desired at the high side of the load. The dimming control means provides control for activation and deactivation of the load and may further provide a means for current limiting. The feedback means is coupled to the voltage conversion means and a current sensing means and provides a control signal to the voltage conversion means that is indicative of voltage drop across the current sensing means which represents the current flowing through the load. The current sensing means may comprise an element which has a predictable voltage-current relationship and thus can provide a measurement of the current flowing through the load based on a collected voltage signal. Based on the control signal received, the voltage conversion means can subsequently adjust its output voltage such that a constant switched current is provided to the load.

Figure 2:
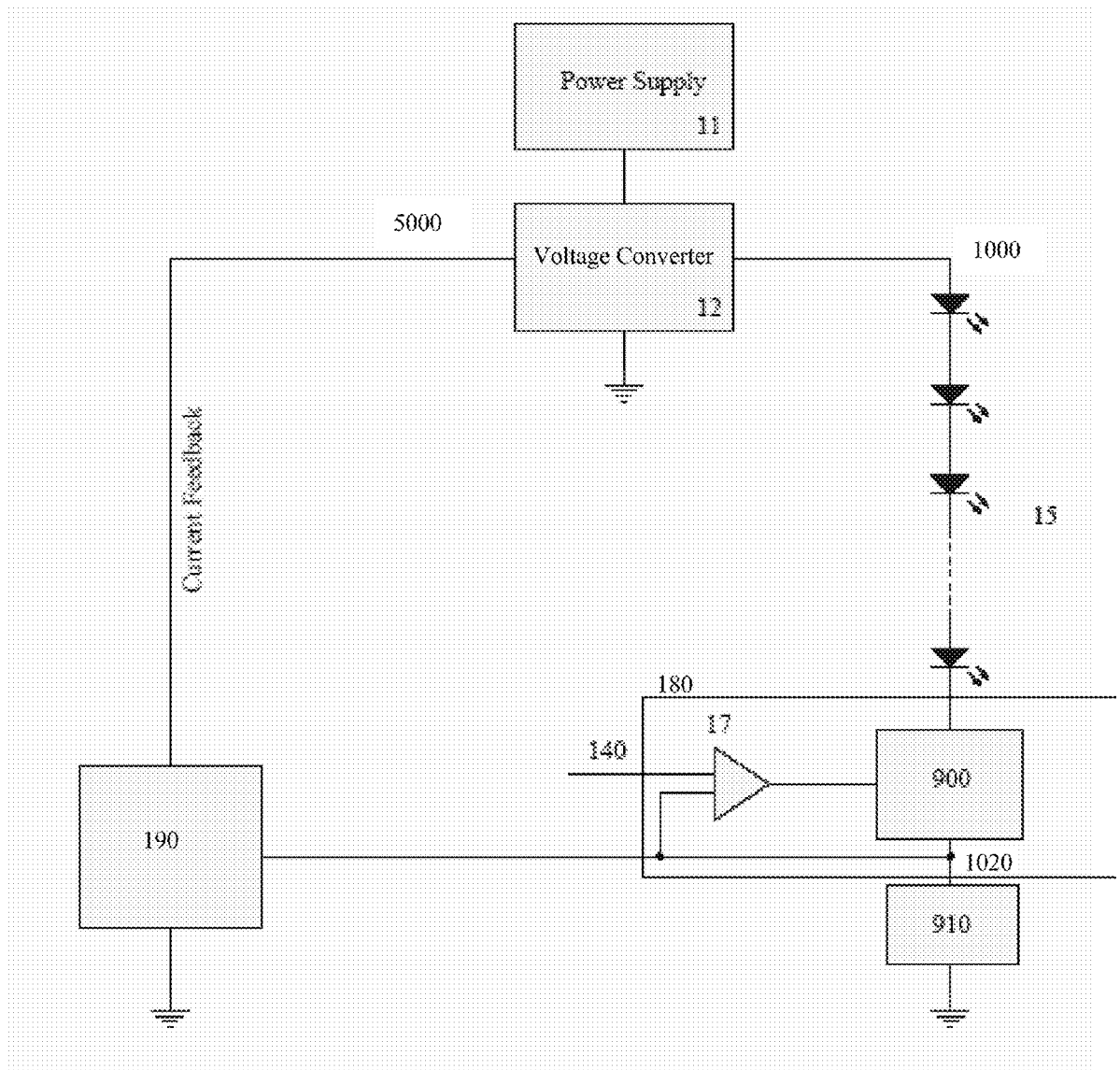
FIG. 2 illustrates a lighting system with a drive and control apparatus according to one embodiment of the present invention.

FIG. 2 illustrates a lighting system comprising a drive and control apparatus according to one embodiment of the present invention. The power supply 11 is connected to a voltage converter 12, which provides a suitable voltage at the high end node 1000 of a string of one or more light-emitting elements 15. Voltage converter 12 can be internally or externally switched at high frequency in order to change its input voltage to a different output voltage at the high end node 1000 of the string of one or more light-emitting elements 15. In one embodiment the switching frequency may vary, for example between about 60 kHz to 300 kHz or other suitable frequency range as would be readily understood. In another embodiment the switching frequency may be fixed, for example at about 260 kHz or 300 kHz. Dimming of the light-emitting elements is provided by a dimming control signal 140, which may be a pulse width modulation (PWM), pulse code modulation (PCM) or other signal, which is provided to the dimming control means 180 which provides a means for activation/deactivation of the string of one or more light-emitting elements 15. The dimming control means comprises an operational amplifier 17 for receiving the dimming control signal 140, which is indicative of duty cycle, and provides a control signal to a switching means 900 configured in series with the string of one or more light-emitting elements 15. A current sensing means 910 is integrated into the drive and control apparatus and provides a means for determination of the current flowing through the light-emitting elements at node 1020, for example. Furthermore, a sample and hold means 190 is integrated into the drive and control apparatus, and can provide a means for providing current feedback signal 5000 to the voltage converter for control of the current flowing through the string of one or more light-emitting elements 15.

In the embodiment illustrated in FIG. 2, current control can be performed in two different ways, which can depend on the duty cycle. During high duty cycles, the voltage output of the voltage converter can be controlled via a sample and hold means 190 to give a predetermined peak current to the light-emitting elements, wherein the switching means 900 can act like an ON/OFF switch. At low duty cycles, the peak current may become unstable due to inherent characteristics of the sample and hold means 190 and the speed of the voltage converter to rapid changes in load current. This instability can be seen referring to FIG. 4A which is representative of peak current in the lighting elements controlled by a circuit which only has ON/OFF switching of the light-emitting elements. During the OFF time of the previous period the output of the voltage converter 12 may have risen too high which may result in a current spike through the light-emitting elements at the first instant the light-emitting elements are activated by switching means 900. The sample and hold feedback circuit and voltage converter eventually brings the peak current under control, however at low duty cycles there may not be sufficient time to do so and therefore low duty cycle pulses may have a higher peak current than higher duty cycle pulses.

Figure 4A:
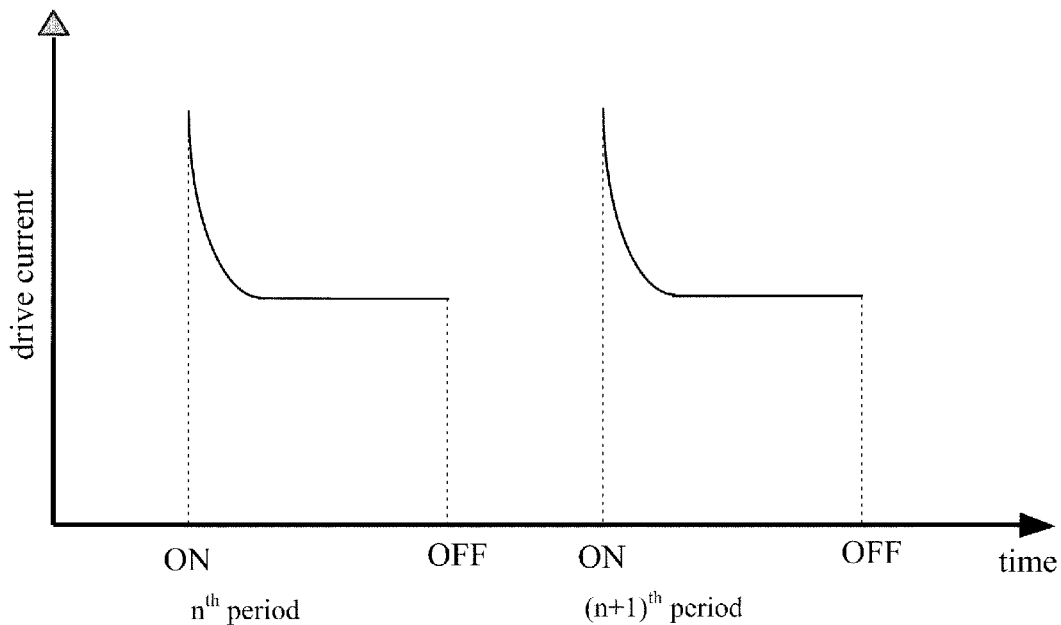
FIG. 4A illustrates a typical drive current to time dependence for a drive and control apparatus having a combination of a sample-and-hold feedback circuit and a simple ON/OFF switched load, according to one embodiment of the present invention.
Figure 4B:
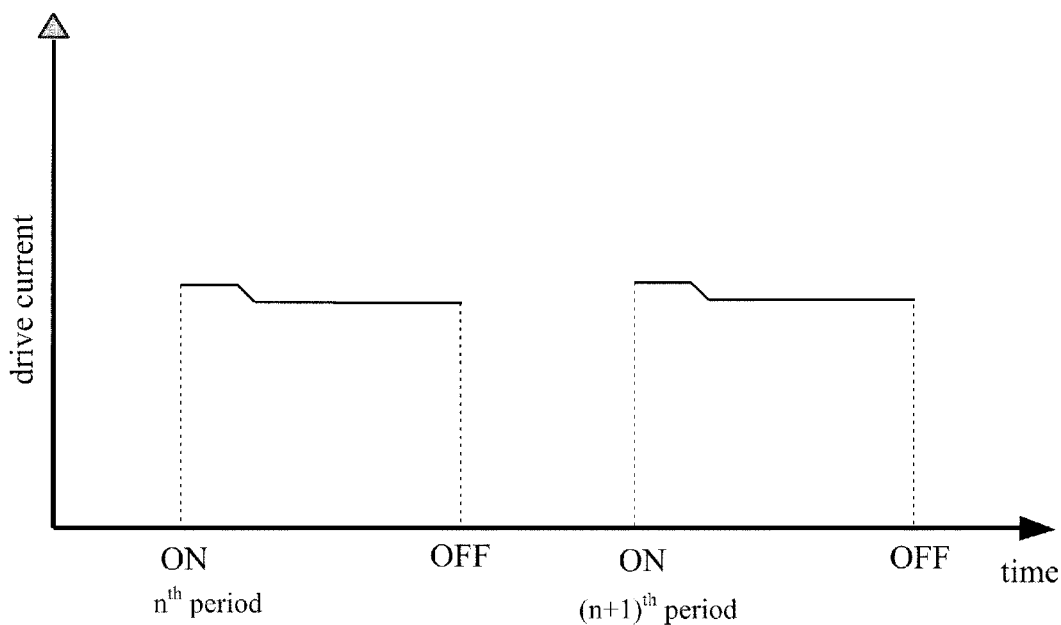
FIG. 4B illustrates a typical drive current to time dependence for a drive and control apparatus having a combination of a sample-and-hold feedback circuit and a resistive switched load according to one embodiment of the present invention.

Therefore according to the present invention, instead of relying solely on the sample and hold means to limit the peak current, the dimming control means 180 can be configured to limit the current to an alternate predetermined level, which for example can be a slightly higher predefined peak current than that set by the sample and hold means. This configuration is depicted in FIG. 4B which illustrates that the current overshoot is now limited by the secondary current limiting means. For example, the high or ON level of dimming control signal 140 can be set to be proportional to this predetermined secondary peak current level and therefore the dimming control signal would alternate between this proportional level and ground, rather than logic level switching. In this way, in response to the feedback signal detected by the op amp 17, switching means 900 is only turned ON partially for a small time at the start of each switching period so as to limit current overshoot, but for the remainder of the period when the sample and hold means is in control, switching means 900 is turned fully ON, thus minimizing switching losses. Since the same feedback signal from the current sensing means 910 is used by both the op amp 17 and the sample and hold means 190, there will be a substantially smooth transition between the two peak current levels. As the sample and hold means and voltage converter start to control the current, the op amp will turn the switching means ON harder, until it is fully ON and is no longer the limiting factor for the current through the electronic devices.

In one embodiment of the present invention, a predetermined threshold defining the transition between high duty cycle and low duty cycle is between about 5% and 30%. In another embodiment the predetermined threshold is between about 10% and 20%. In another embodiment the predetermined threshold is 10%.

Figure 3:
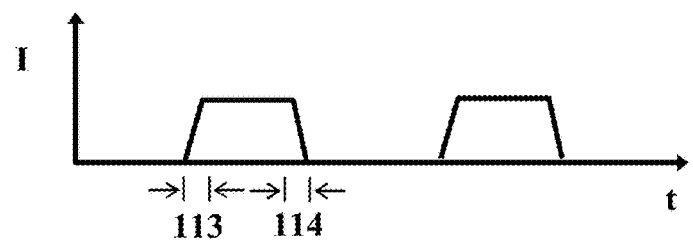
FIG. 3 illustrates a representation of the time dependence of the drive current for a lighting system with a dimming control circuit according to one embodiment of the present invention.

In an embodiment, the present invention can also reduce switching transients and improve response times for operational control of the light-emitting elements, as switching the load (one or more electronic devices) requires the switching of only a single switching means as opposed to enabling and disabling a voltage converter which requires switching multiple components. For example, FIG. 1 illustrates a representation of the relative current that may flow through a load when a voltage converter is enabled and disabled at a low frequency. FIG. 3 illustrates a representation of the relative current that may flow through the one or more electronic devices when a drive and control apparatus according to an embodiment of the present invention is used, wherein the load is switched. As is readily apparent, the rise time 113 and fall time 114 of the signal illustrated in FIG. 3 can be significantly less than the rise time 111 and fall time 112 of the prior art signal illustrated in FIG. 1. The electronic devices can thereby be digitally switched at a high frequency while substantially minimizing switching losses for a majority of the duty cycle rather than switching the voltage converter at a low frequency as is performed in the prior art. Furthermore the drive and control apparatus according to the present invention can improve electronic device operation during low duty cycles since the prior art method of switching the voltage converter ON and OFF would not allow low duty cycles at higher switching frequencies, whereas the present invention does.

In addition, the drive and control apparatus according to the present invention can provide substantially full duty cycle control while ensuring relatively constant current over the entire range. As previously discussed, FIG. 4A illustrates the current output versus duty cycle for a circuit with solely a sample and hold circuit and FIG. 4B illustrates the current output versus duty cycle which can be provided by the drive and control apparatus according to an embodiment of the present invention, wherein two levels of current control are provided. For example, keeping the ON current through light-emitting elements constant, can allow a substantially consistent and predictable luminous flux output of the light-emitting elements to be obtained, and can also reduce the risk of compromising the lifetime of the light-emitting elements which can result from exceeding their maximum current rating. For example, state-of-the-art high-flux, one-watt LED packages have a maximum rating for average and instantaneous current of about 350 mA and 500 mA, respectively. Since the current can be controlled closely using the drive and control apparatus of the present invention, the light-emitting elements can be operated at substantially their maximum average current rating with reduced or limited risk of exceeding their maximum instantaneous current rating.

Figure 5:
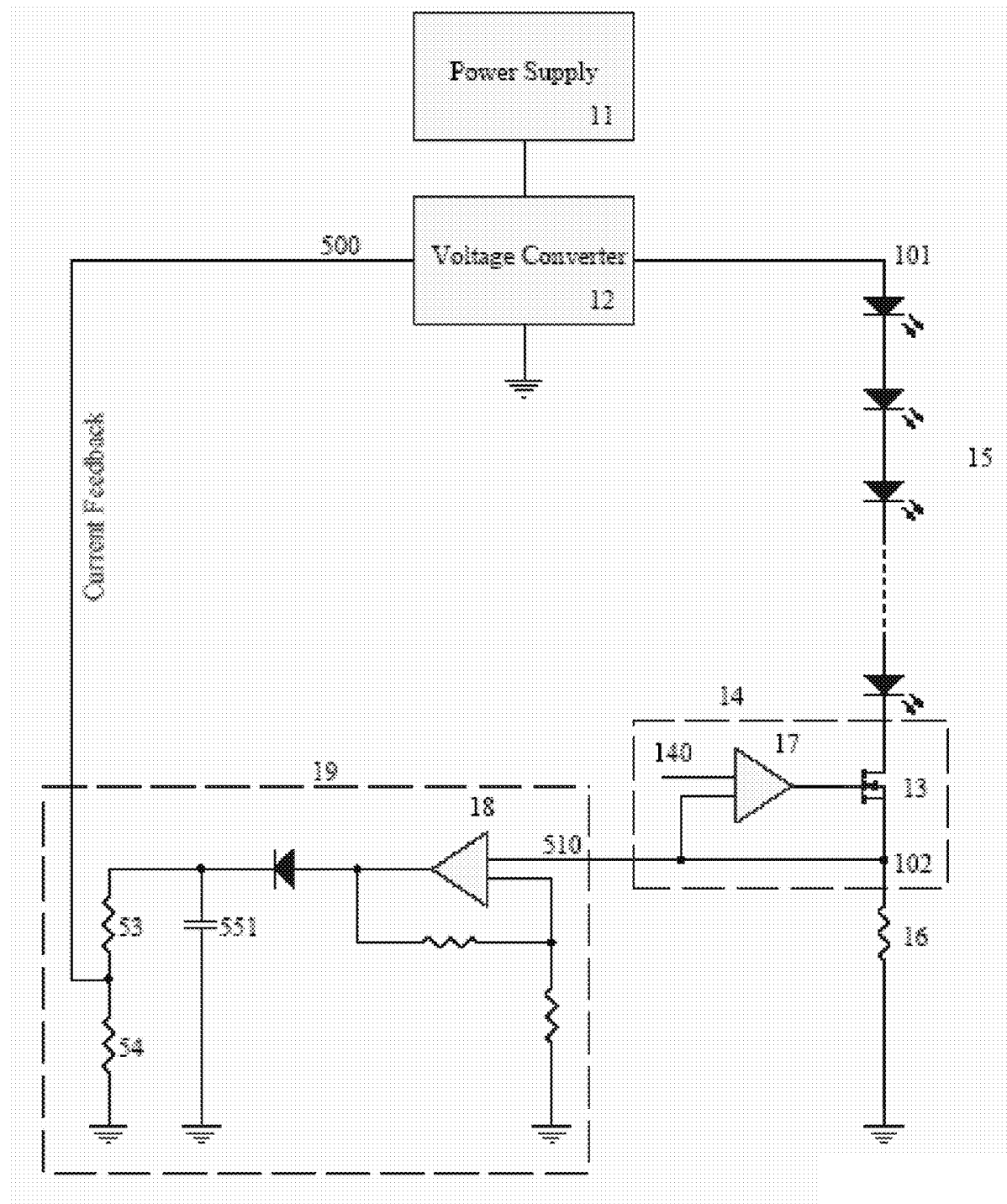
FIG. 5 illustrates a lighting system with a drive and control apparatus according to another embodiment of the present invention.

FIG. 5 illustrates a drive and control apparatus according to one embodiment of the present invention, wherein an embodiment of the circuitry of a sample and hold means 19 is provided. The current sensing device 16 is configured as a resistor having a predetermined voltage to current relationship, thereby providing a means for determining the current through the string of one or more light-emitting elements 15 through the detection of voltage at node 102. In addition, the switching means 13 associated with the dimming control means is configured as a transistor which is responsive to a signal from the op-amp 17 which provides the signal based on a received dimming control signal 140.

Figure 6:
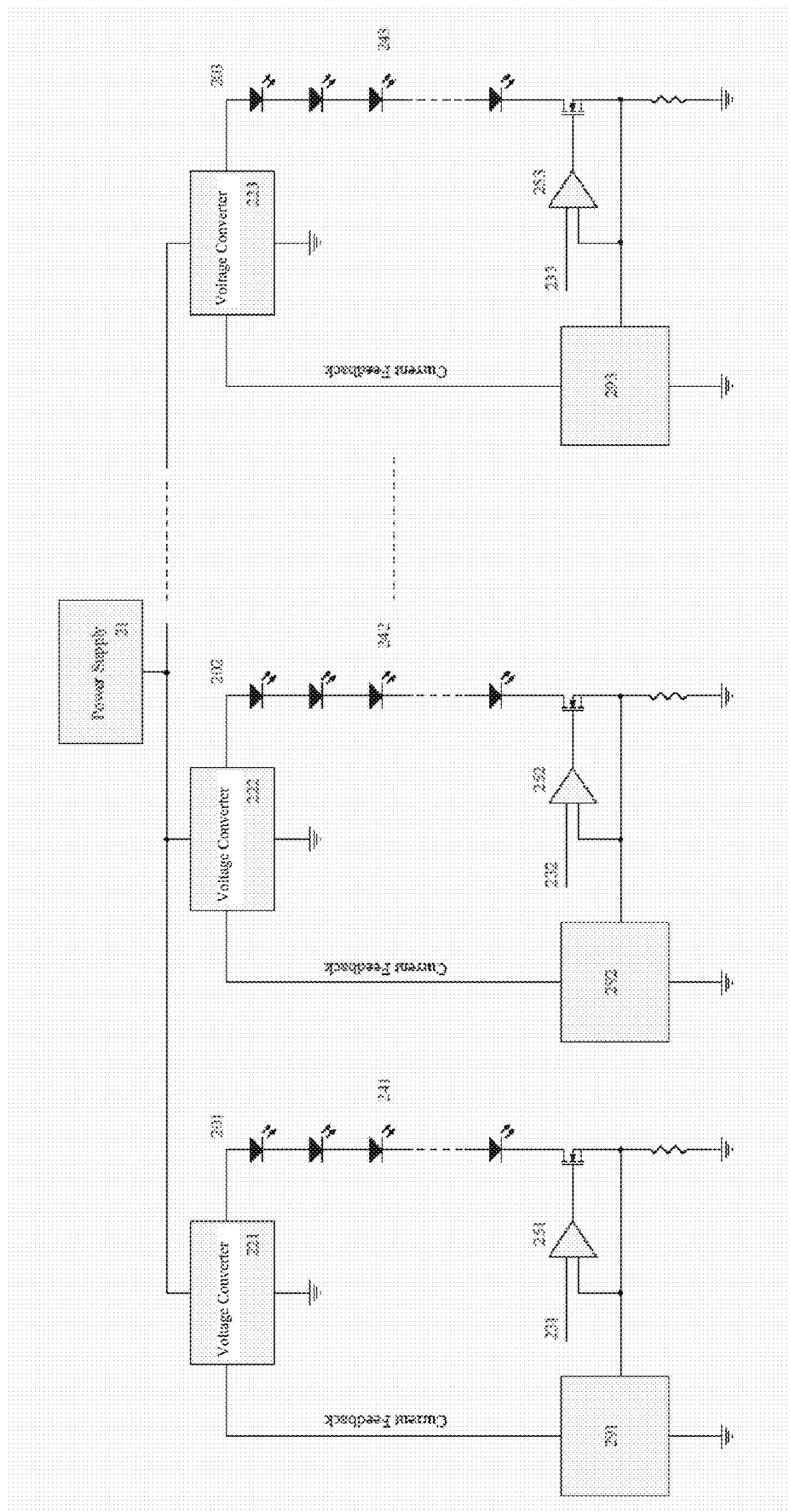
FIG. 6 illustrates a lighting system comprising a single power supply together with multiple strings of light-emitting elements each including a drive and control apparatus, according to one embodiment of the present invention.

In one embodiment, multiple strings of one or more light-emitting element can be driven using a single power supply 21 as illustrated in FIG. 6. Each string of light-emitting elements 241, 242 and 243 may have its own voltage converter 221, 222 to 223. This configuration may be beneficial when each string of one or more light-emitting elements has a different total forward voltage. Each voltage converter is thus appropriately adjusted to provide the forward voltage required by the respective string of one or more light-emitting elements 241, 242 or 243. Control signals 231, 232 and 233 are received at the respective op-amps 251, 252 and 253 which form a portion of each respective dimming control means associated with each string of one or more light-emitting elements. Feedback signals representative of the current through each of the strings of one or more light-emitting elements 241, 242 and 243 can be transmitted back to the respective voltage converters 221, 222 and 223 via respective sample and hold circuits 291, 292 and 293 which directly receives signals from their respective op-amps 251, 252, and 253. An advantage of providing each string of one or more light-emitting elements with an individual voltage converter is that each string of one or more light-emitting elements may be operated approximately at its individual maximum current rating. In addition, having different voltage converters and a means for digitally switching the voltage for each string can allow each string of one or more light-emitting elements to be dimmed over substantially a full range from 0% to 100% luminous flux output of the light-emitting elements.

Voltage Conversion Means

The voltage conversion means provides a means for converting a voltage received from a power supply from first magnitude to a voltage of a second magnitude, based on an input signal. It would be readily understood that the first and second magnitudes can be the same or different and may be dependent on a required voltage drop over one or more strings of one or more electronic devices.

In one embodiment the power supply may be used to convert AC power to DC power for example, and the voltage conversion means may be a DC-to-DC converter. The DC-to-DC converter may be a step-down switch mode power supply (SMPS), such as a Buck converter, for example. A Buck converter, or other converter, may be used with standard external components such as a diode, capacitor, inductor and feedback components. Buck converters are available in standard integrated circuit (IC) packages and together with the additional external components can perform DC-to-DC conversion with an efficiency of about 90% or higher. Examples of other converters that can be used in place of a Buck converter include Boost converters, Buck-Boost converters, Cuk converters and Fly-Back converters.

The voltage converter can operate at a high frequency to generate a particular voltage required by a string of one or more electronic devices, for example light-emitting elements, which can be a stable output voltage with limited harmonic content. By operating the voltage converter at high frequencies, high efficiency and low voltage ripple in the output voltage signal can be achieved. In addition, switching at high frequencies can allow the one or more electronic devices to be switched at frequencies that are high enough to be outside the audible frequency range and can also aid in the reduction of thermal cycling of the electronic devices. This is an advantage over switching the voltage converter ON and OFF which is typically performed at low frequencies, for example typically less than about 1 kHz, which is within the typical audible range of a human being.

In one embodiment in which multiple strings of one or more electronic devices for example light-emitting elements, require the same voltage supply at the high end of the strings, these light-emitting element strings may have their high ends connected to a single voltage converter. For example, for an RGB based luminaire, a voltage converter can be associated with all strings of one or more light-emitting elements of one colour and therefore this example luminaire would require three voltage converters. Furthermore, strings of light-emitting elements may be connected in a parallel, series, or parallel/series configuration.

Dimming Control Means

The dimming control means provides a means for the control of the activation of the one or more electronic devices with which it is associated. The dimming control means is configured to control the supply of a relatively stable current level across the one or more electronic devices, wherein this control is independent of the duty cycle.

In one embodiment dimming of light-emitting elements is typically done by switching the devices ON and OFF at a rate at which the human eye perceives the light output as an average light level based on the duty cycle rather than a series of light pulses. The relationship between duty cycle and light intensity may therefore be linear over the entire dimming range assuming the peak current is kept constant regardless of duty cycle. With further regard to FIG. 2, dimming can be provided using a dimming control signal 140 input via op-amp 17 and subsequently transmitted to a switching means 900 enabling activation and deactivation of the string of one or more light-emitting elements 15 with which it is associated.

In an embodiment, a switching means can be a semiconductor switch for example a field effect transistor (FET) switch, bipolar junction transistor (BJT) switch or any other switching device as would be readily understood by a worker skilled in the art. The load can typically be switched at a frequency that is lower than the switching frequency of the voltage conversion means so that the ripple in the power supply output is averaged over the period of time that the one or more electronic devices are switched ON. Switching the electronic devices at a relatively high frequency can allow them to be switched at frequencies that are outside the audible range. In addition, switching the load at relatively high frequencies can reduce the effects of thermal cycling on the electronic devices since they are switched ON for a small fraction of time before subsequently being switched OFF.

In one embodiment, for example during low duty cycles, when the feedback signal becomes too small to adequately control the voltage conversion means, the dimming control means comprises a means for limiting the current by activating the switching means in the linear region allowing only a certain amount of current to flow.

During low duty cycles, and with further reference to FIG. 2, the dimming control signal 140 can be switched at a given voltage level to provide a reference voltage to op-amp 17. During the ON phase, op-amp 17 may substantially maintain the same voltage at node 1020 as defined by signal 140. The voltage at node 1020 is directly related to the current passing through current sensing means 910. If the sample and hold means 190 is maintaining a current slightly lower that set by the dimming control signal 140 then op-amp 17 will drive the switching means 900 to a fully ON state. If the sample and hold means 190 is no longer able to maintain the current at a desired level then op-amp 17 will operate the switching means 900 in the linear region, thereby limiting the current through the string of one or more light-emitting elements 15 to the value set by the dimming control signal 140.

Sensing Means

The sensing means is configured to provide feedback of the current flowing through the one or more electronic devices for transmission to a voltage conversion means. In this manner a relatively constant current level can be maintained through the one of more electronic devices during activation periods thereof.

In one embodiment as illustrated in FIG. 5, the current sensing device 16 is configured as a fixed resistor, wherein this resistor has a predetermined current to voltage relationship, thereby enabling detection of the voltage at node 102 and thereby establishing the current flow through the string of one or more light-emitting elements 15. When the string of one or more light-emitting elements 15 is switched ON, the sense voltage at node 102 generated by current sensing device 16 is fed back to voltage converter 12 via sample and hold circuit 19. In an alternate embodiment, current sensing device 16 may be replaced by variable resistor, inductor, or some other element for generating the sense voltage at node 102 which is representative of the current flowing through the string of light-emitting elements 15 during the ON phase. In one embodiment, the current sensing device 16 is a low value, high precision sense resistor which is stable over a wide temperature range to ensure accurate feedback.

Feedback Means

A drive and control apparatus further comprises a feedback means coupled to the voltage conversion means and the current sensing means in order to provide a feedback signal to the voltage conversion means that is indicative of voltage drop across the current sensing means which represents the current flowing through the load of one or more electronic devices. This therefore provides a means for appropriately controlling the magnitude of the voltage provided by the voltage conversion means to the one or more electronic device for operation thereof.

In one embodiment as illustrated in FIG. 5, a sample and hold means is used to maintain the desired current level flowing through the electronic devices being driven during the ON phase. At turn ON, the current flowing through the electronic devices causes a signal 510 to be generated which is fed back through sample and hold means 19 to the voltage converter 12 as signal 500. Voltage converter 12 then adjusts its output voltage to provide a constant current to the string of one or more light-emitting elements 15. When the string of one or more light-emitting elements 15 is turned OFF, the sample and hold means 19 maintains the feedback signal 500 until the string of one or more light-emitting elements 15 is turned ON again. When the load is switched back ON the output voltage will still be at the same set-point as when the load was switched OFF, thereby substantially eliminating any current spikes or dips in the load. As would be readily understood by a worker skilled in the art, sample and hold means 19 can comprise various types of circuitry.

An error may be introduced in the feedback signal during low duty cycles as a result of using this type of sample and hold means. During low duty cycles, when signal 510 is only received by the sample and hold means for a short duration, the sample and hold means 19, is not given enough time to charge to a required level. This can cause the current feedback signal 500 to drop and voltage converter 12 will increase its output in response to this drop. The current through the string of one or more light-emitting elements 15 may then increase beyond the limit maintained during higher duty cycles. This error may increase as the light-emitting element ON-time decreases and the current may further increase as a result of voltage increase by the voltage converter. As previously described, the dimming and control means according to the present invention, can be configured to substantially maintain a desired switched current through the string of one or more light-emitting elements during low duty cycles.

Figure 7:
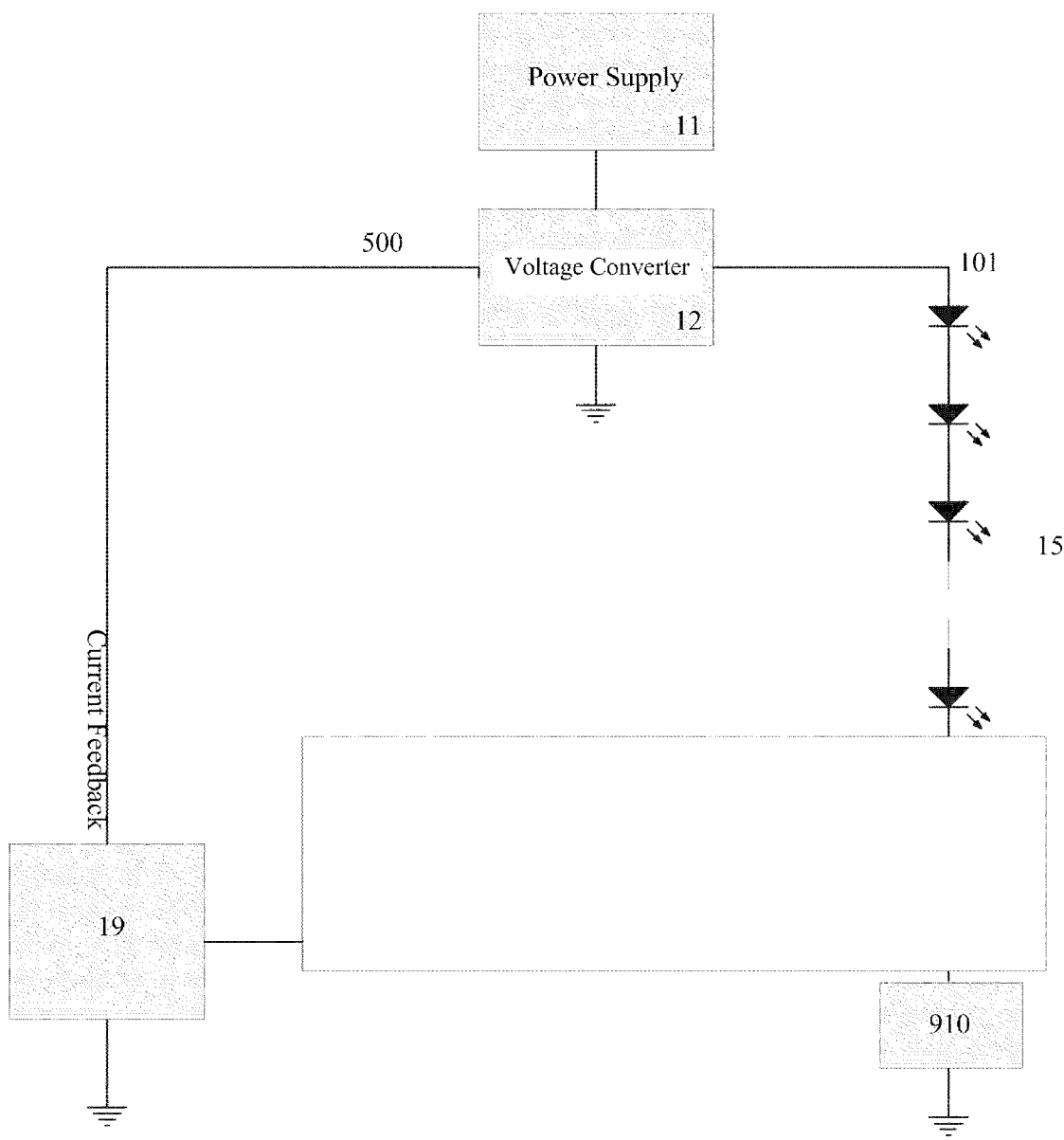
FIG. 7 illustrates a lighting system with a drive and control apparatus according to one embodiment of the present invention.
Figure 8:
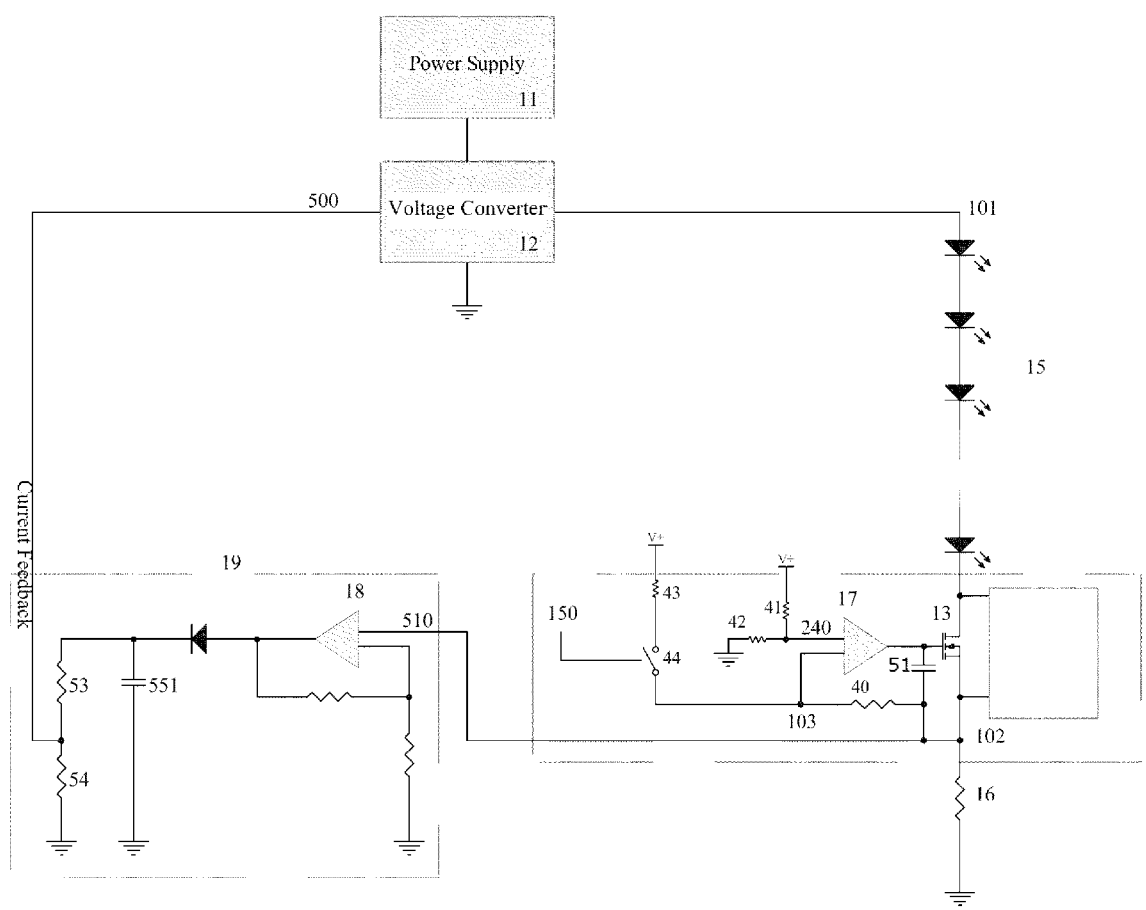
FIG. 8 illustrates a lighting system with a drive and control apparatus according to the embodiment illustrated in FIG. 7.
Figure 9:
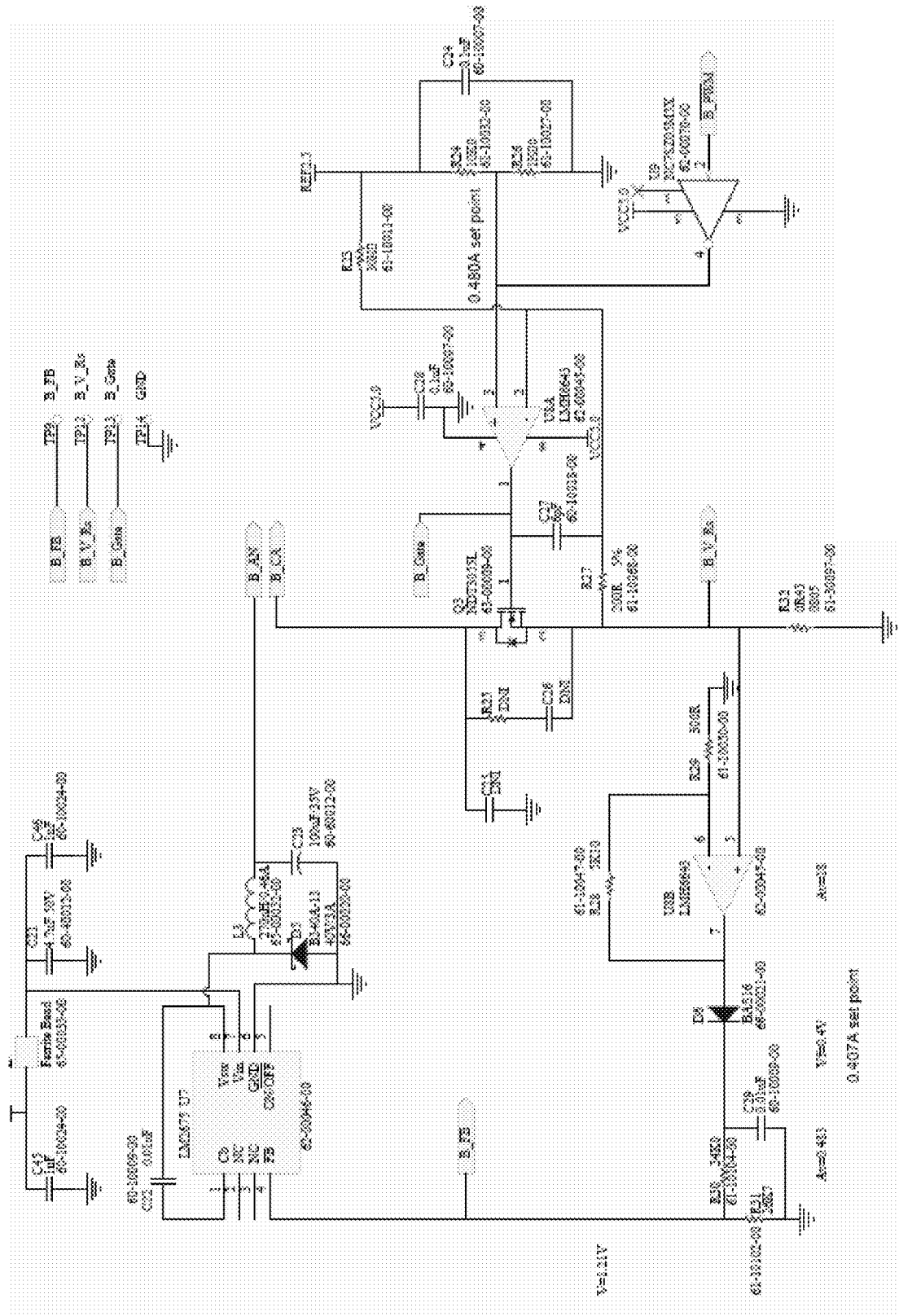
FIG. 9 is a circuit diagram of a blue channel light-emitting element driver configured according to one embodiment of the present invention.
Figure 10:
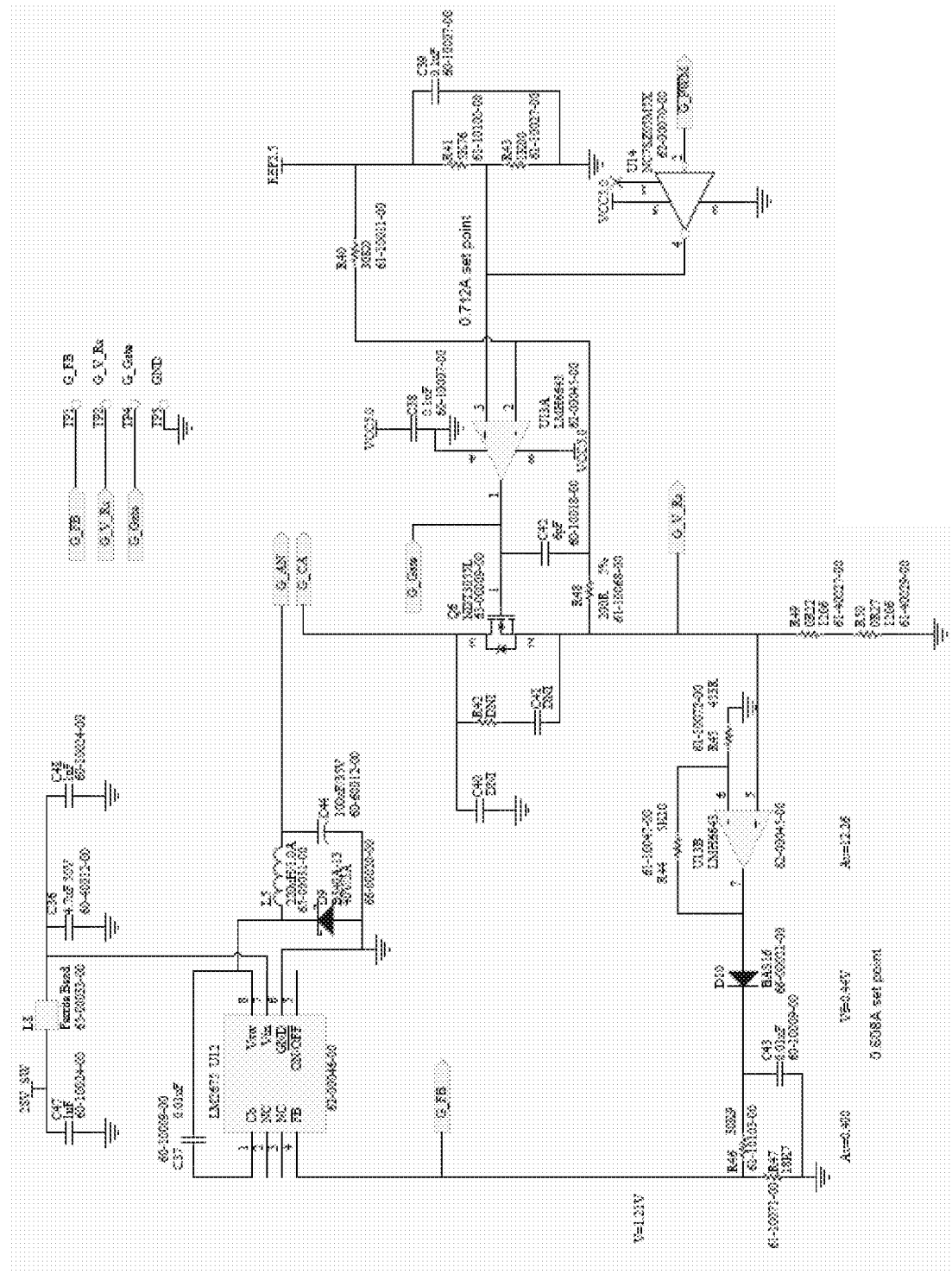
FIG. 10 is a circuit diagram of a first green channel light-emitting element driver configured according to one embodiment of the present invention.
Figure 11:
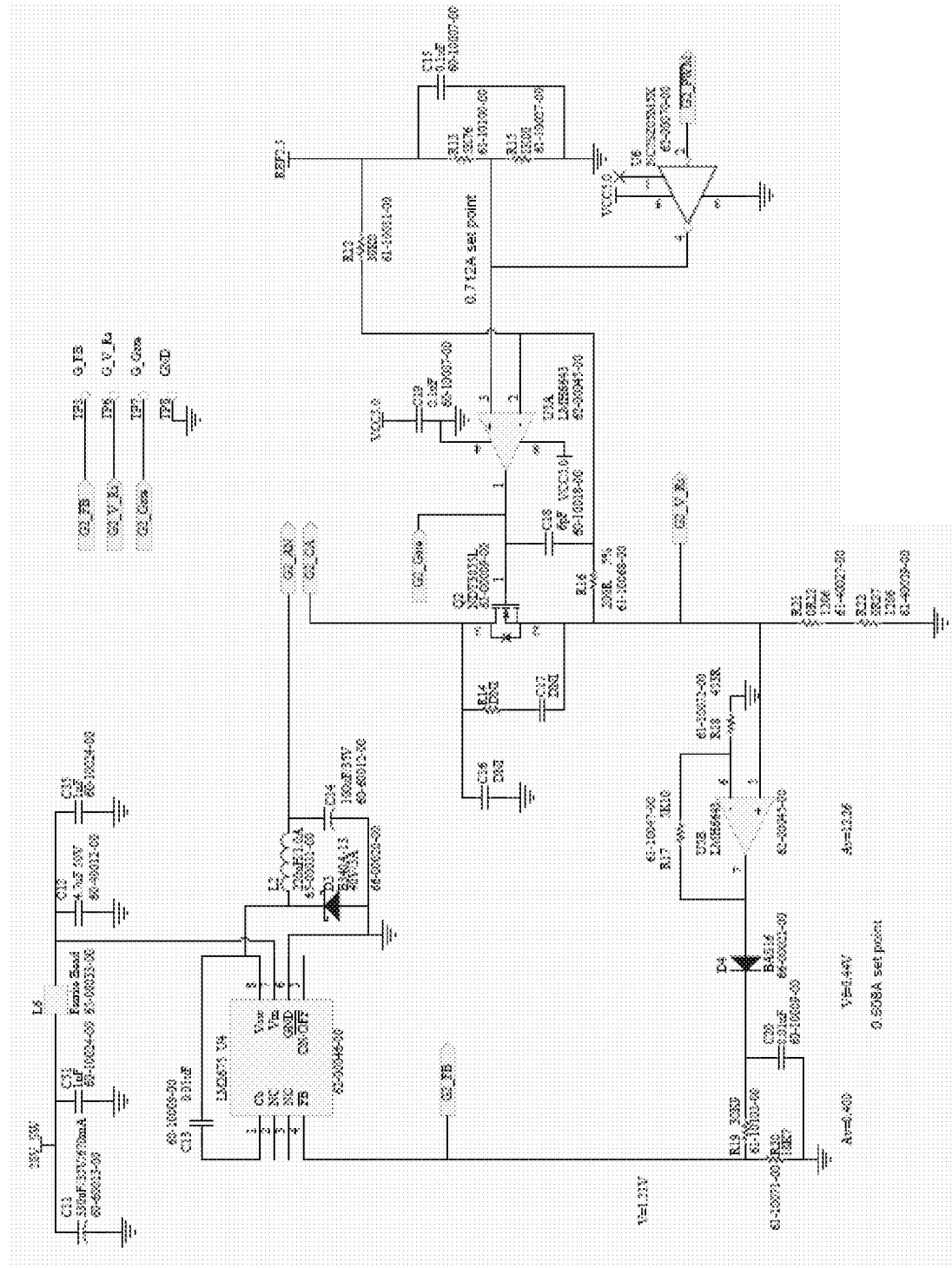
FIG. 11 is a circuit diagram of a second green channel light-emitting element driver configured according to one embodiment of the present invention.
Figure 12:
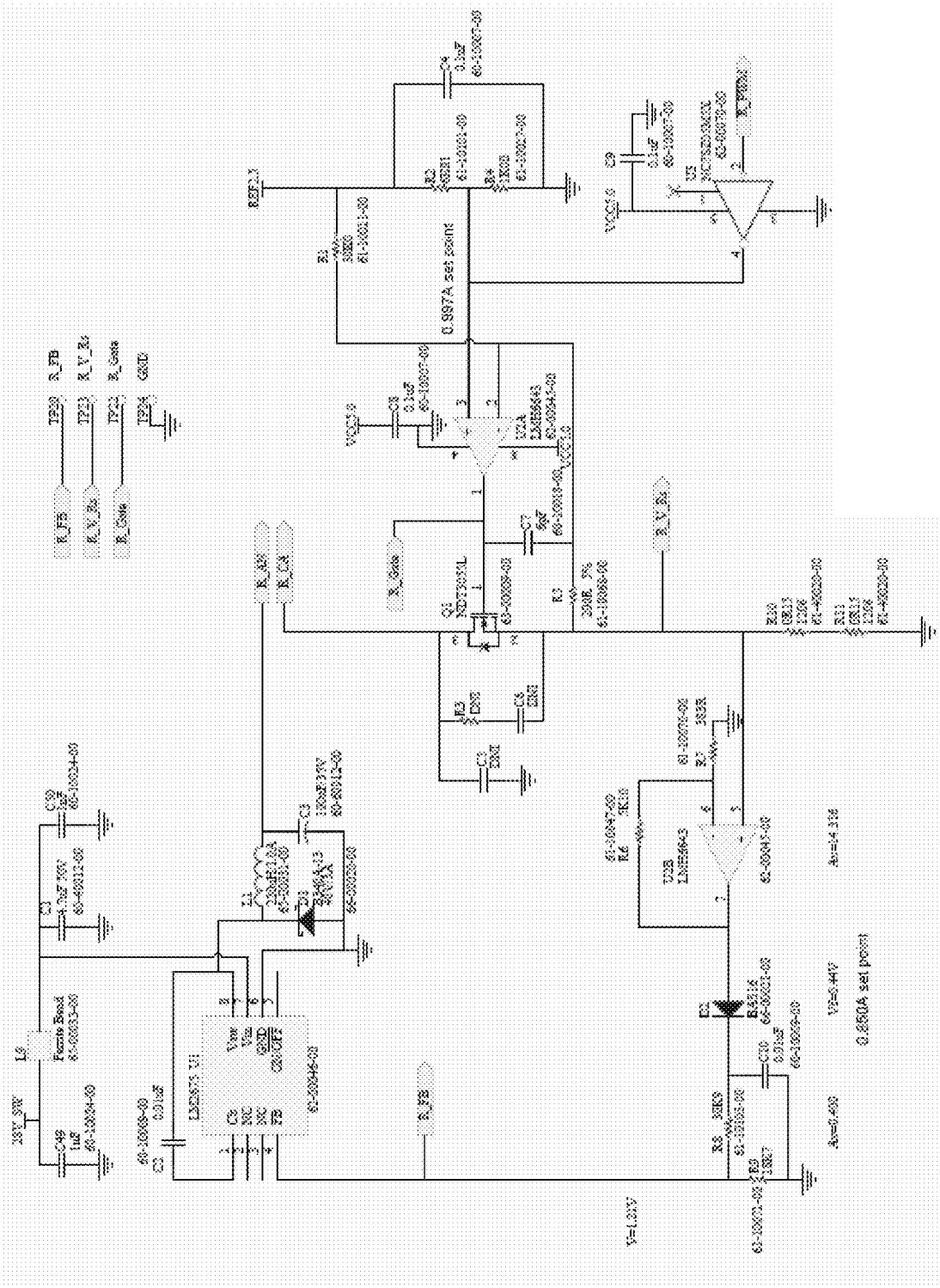
FIG. 12 is a circuit diagram of a red channel light-emitting element driver configured according to one embodiment of the present invention.

FIG. 7 illustrates another embodiment of a drive and control apparatus capable of accomplishing a desired level of functionality. In particular, rather than applying a dimming signal 140 as used in FIG. 2, which was proportional to the desired peak current level, a dimming control signal in the form of a logic level switching signal 150 can be used in conjunction with switching means 800 and resistor 40 to provide a means for dimming the lighting system. Signal 240 is the fixed voltage reference which is proportional to the desired peak current. Referring to FIG. 8, which is a specific embodiment of that illustrated in FIG. 7, a high speed analog switch 44 is enabled and disabled for dimming control. When switch 44 is enabled, resistors 43 and 40 act as a voltage divider which can be set to a value higher than the voltage reference produced by resistors 41 and 42 which can ensure that the operational amplifier (op amp) 17 turns switching means 13, for example a FET switch, OFF which prevents current from flowing through the string of one or more light-emitting elements 15. When switch 44 is disabled, this switch means achieves a high impedance state, and the signal 103 at the inverting input of op amp 17 is representative of the current flowing through the current sensing device 16. For large duty cycles, the current feedback loop and voltage converter 12 can maintain the voltage level at node 101 such that signal 103 will typically be lower than the maximum desired current level set by the voltage reference 240. Thus the op amp 17 can switch switching means 13 hard ON and hard OFF. In the embodiment illustrated in FIG. 8, due to the configuration of the analog switch 44, the ON and OFF periods of the light-emitting elements can be the complement of the logic level switching signal 150. As the duty cycle drops below a certain level, for example about 10%, and the output voltage level at node 101 rises which could cause the peak current to rise above a desired threshold, then op amp 17 can reduce the voltage level it applies to the gate of switching means 13, and hence the switching means will be switched in a soft manner, dissipating some power to limit the peak current. However, at very low duty cycles, the total average power dissipated can still be small. Op amp 17 may be required to operate at a sufficiently high speed in order to be able to effectively prevent current spikes or excessive current peaking through the string of one or more light-emitting elements. However, the use of a high-speed op amp may result in undesired ringing or switching transients. It will be understood by those skilled in the art that capacitor 51 and other components 50, may optionally be added to eliminate ringing or other switching transients, for example. The other components can be for example a bypass capacitor and a snubber comprising a resistor and capacitor in series to provide this desired functionality. Other configurations of these components would be readily understood by a worker skilled in the art.

FIGS. 9, 10, 11 and 12 are circuit diagrams of a blue channel light-emitting element driver, first green channel light-emitting element driver, second green channel light-emitting element driver and red channel light-emitting element driver, respectively, each configured according to embodiments of the present invention. The operation of these circuit diagrams will be substantially the same as described in relation to FIG. 8, while each circuit diagram is designed having specific regard to a particular colour of light-emitting element.

Figure 13:
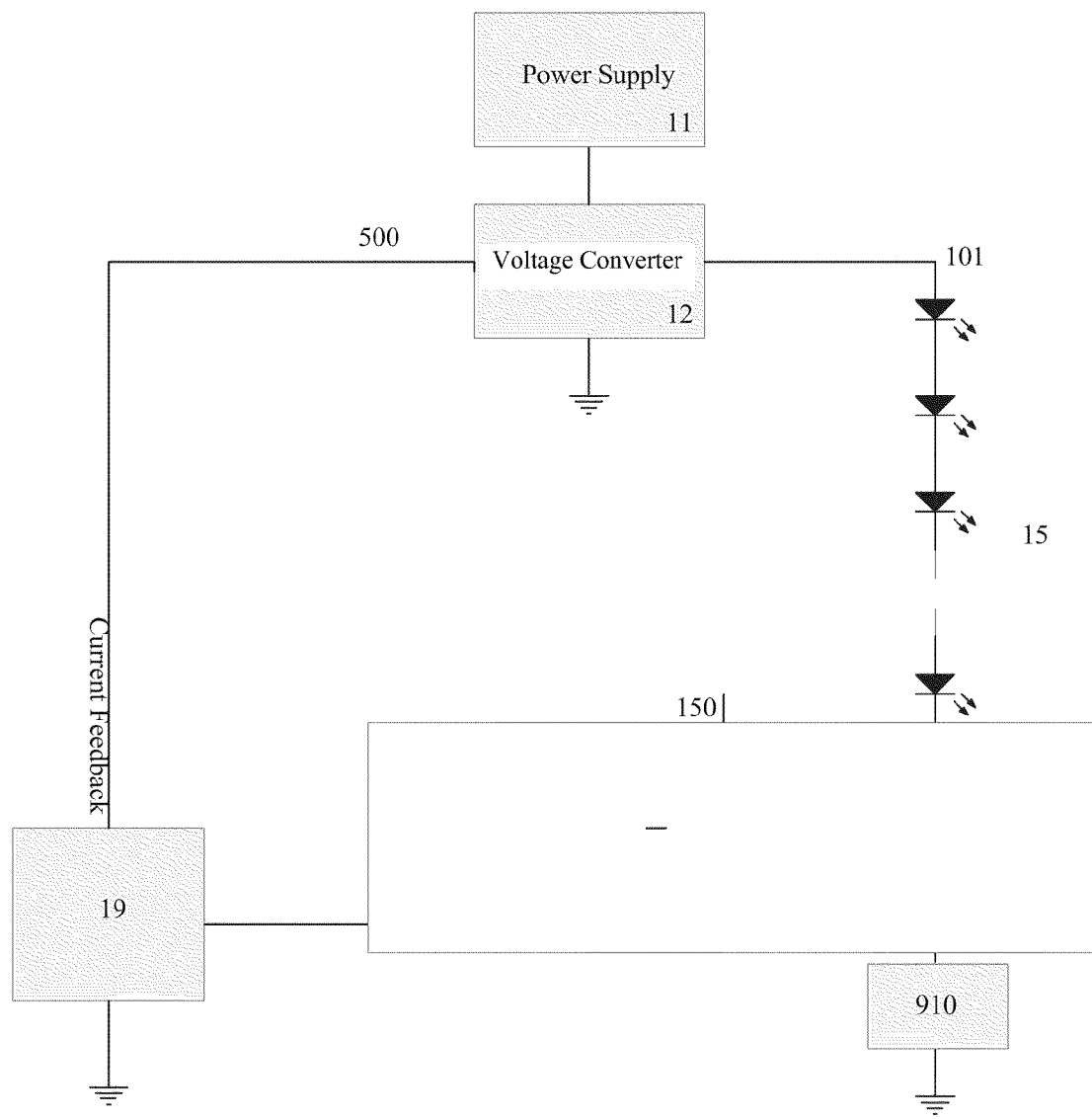
FIG. 13 illustrates a lighting system with a drive and control apparatus according to one embodiment of the present invention.
Figure 14:
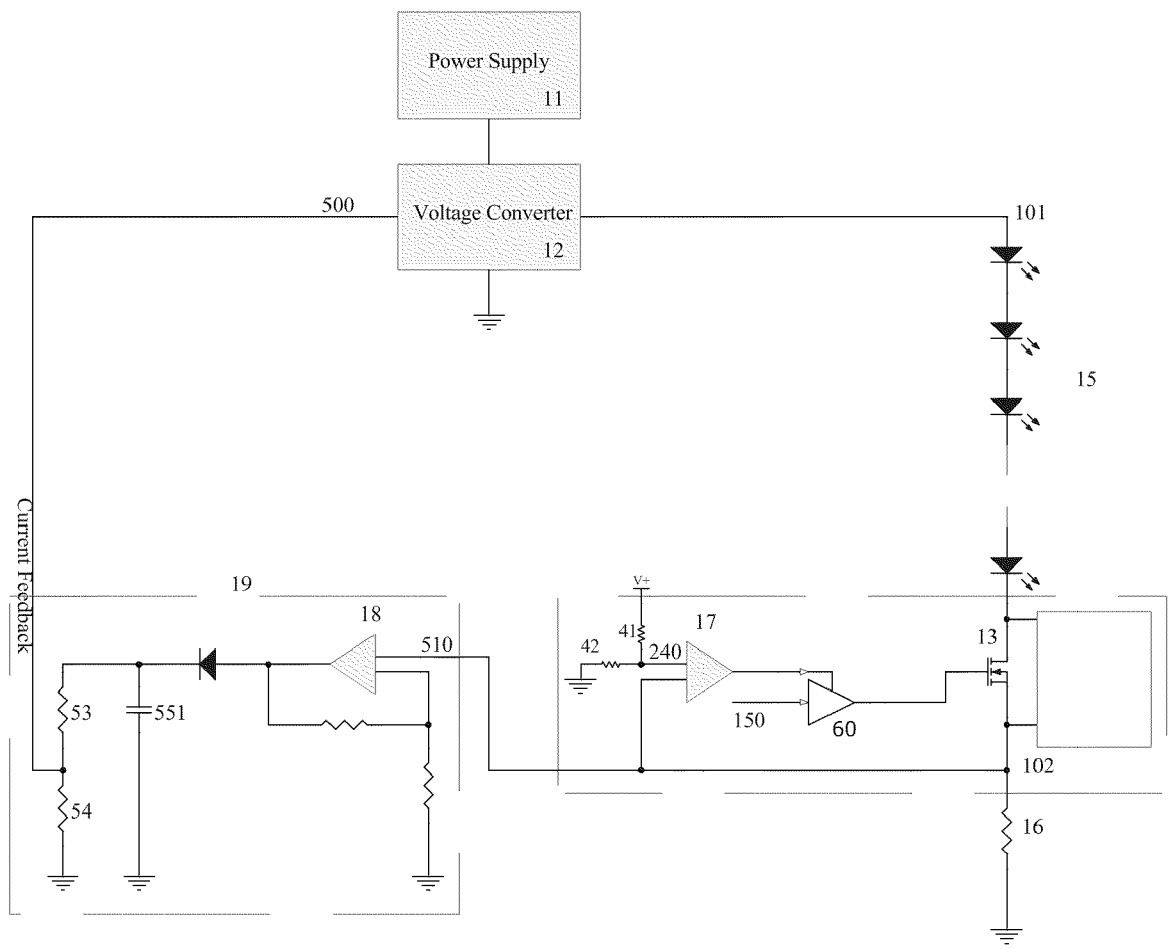
FIG. 14 illustrates a lighting system with a drive and control apparatus according to the embodiment illustrated in FIG. 13.
Figure 15:
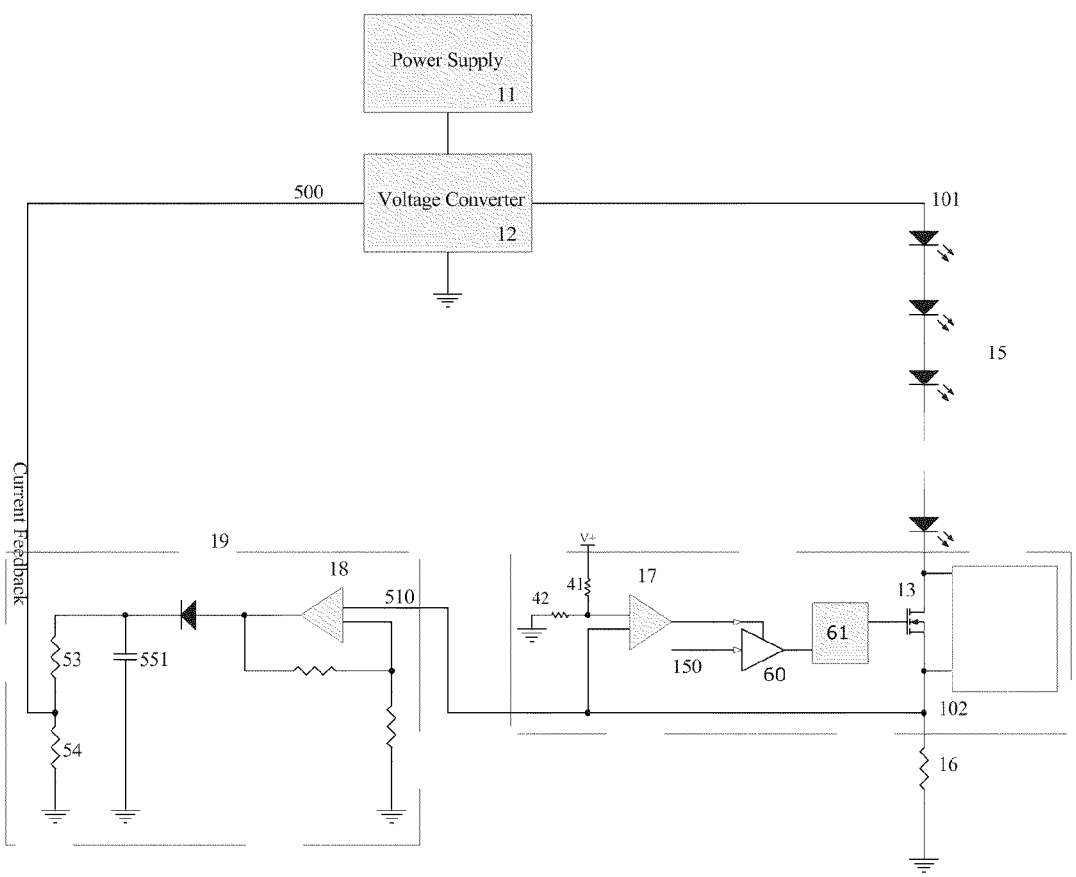
FIG. 15 illustrates another lighting system with a drive and control apparatus according to the embodiment illustrated in FIG. 13.

FIGS. 13 and 14 illustrate alternate embodiments of the present invention. For example, the dimming signal 150 can be applied to a buffer 60 which drives the switching means 13. The buffer turns the switching means hard ON and hard OFF with the dimming signal for high duty cycles. At lower duty cycles, the voltage level at node 101 can become high and op amp 17 may react to the current sense signal if this signal is higher than the set reference voltage 240. In this instance the buffer can be disabled, thereby shutting the switching means OFF. The sense voltage 102 can drop substantially instantly, thereby causing the op amp to re-enable the buffer and turn the switching means ON. Provided the op amp, buffer, and switching means are sufficiently fast, this ON-OFF cycling can occur sufficiently rapid such that the peak current may not rise significantly above the desired reference level, however there may be a slight ripple in the current level. It will be understood by those skilled in the art that to achieve adequate performance, a switching means driver 61, as illustrated in FIG. 15, may be required to switch the switching means sufficiently fast. Furthermore components 50 may be required to reduce or eliminate ringing or undesirable switching transients. The other components can be for example a bypass capacitor and a snubber comprising a resistor and capacitor in series to provide this desired functionality. Other configurations of these component would be readily understood by a worker skilled in the art.

Figure 16:
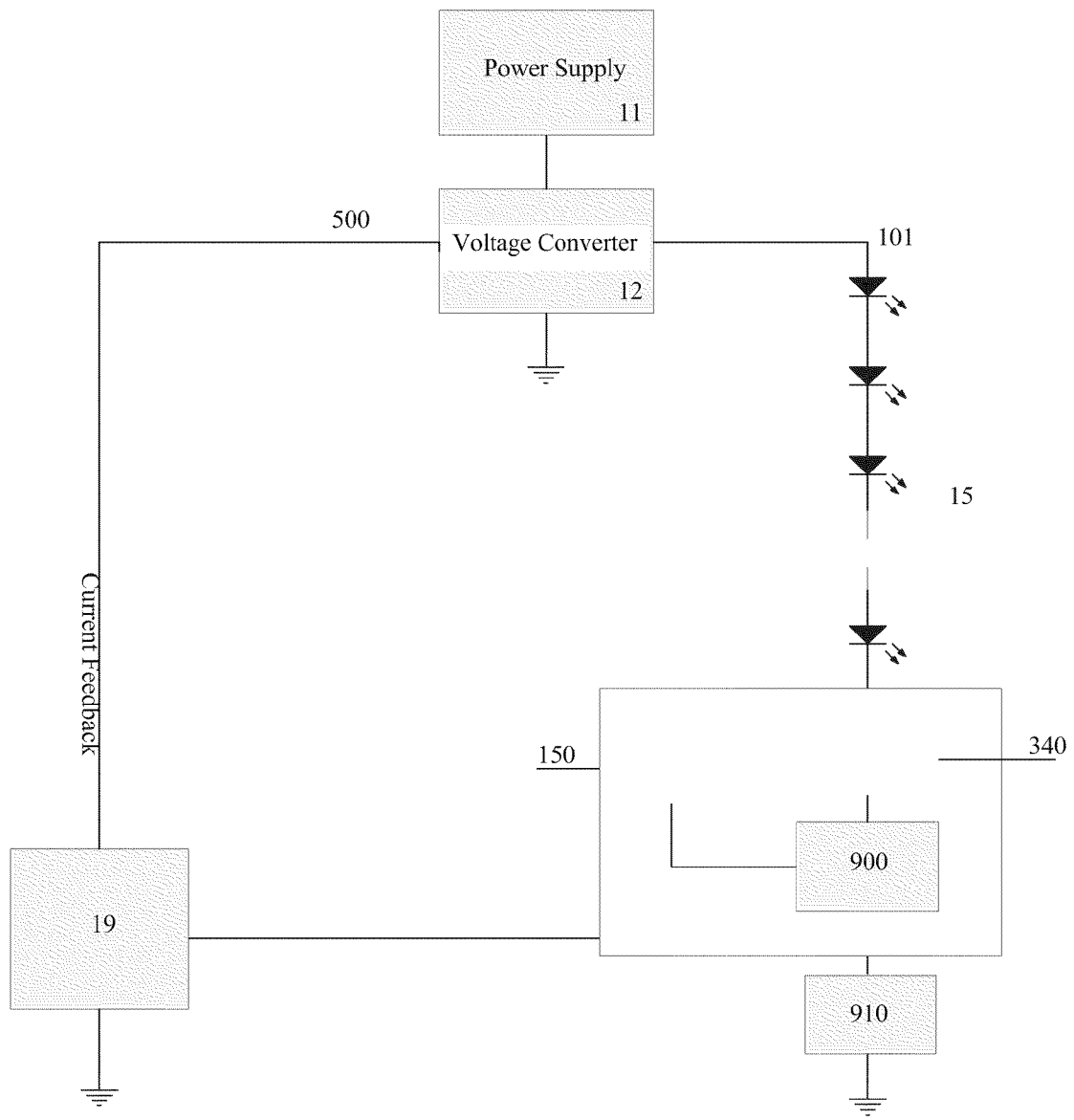
FIG. 16 illustrates a lighting system with a drive and control apparatus according to one embodiment of the present invention.
Figure 17:
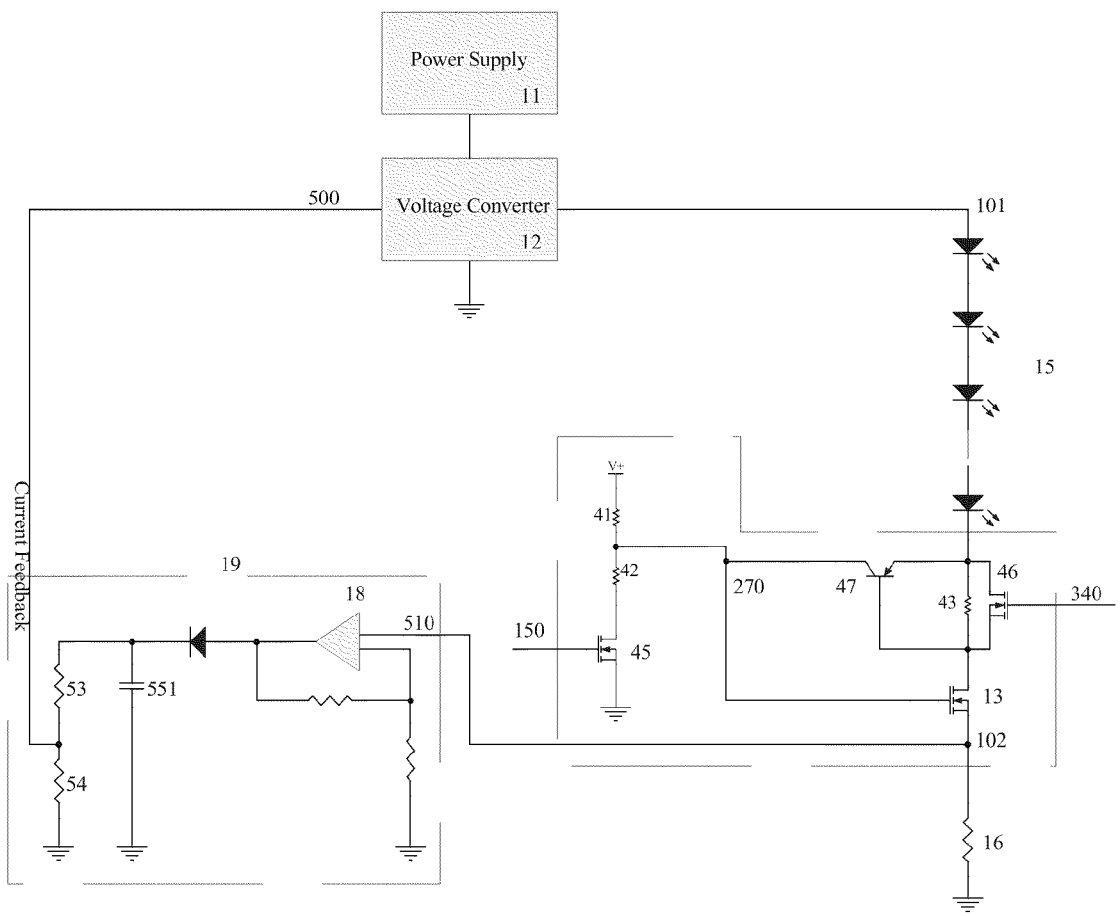
FIG. 17 illustrates a lighting system with a drive and control apparatus according to the embodiment illustrated in FIG. 16.
Figure 18:
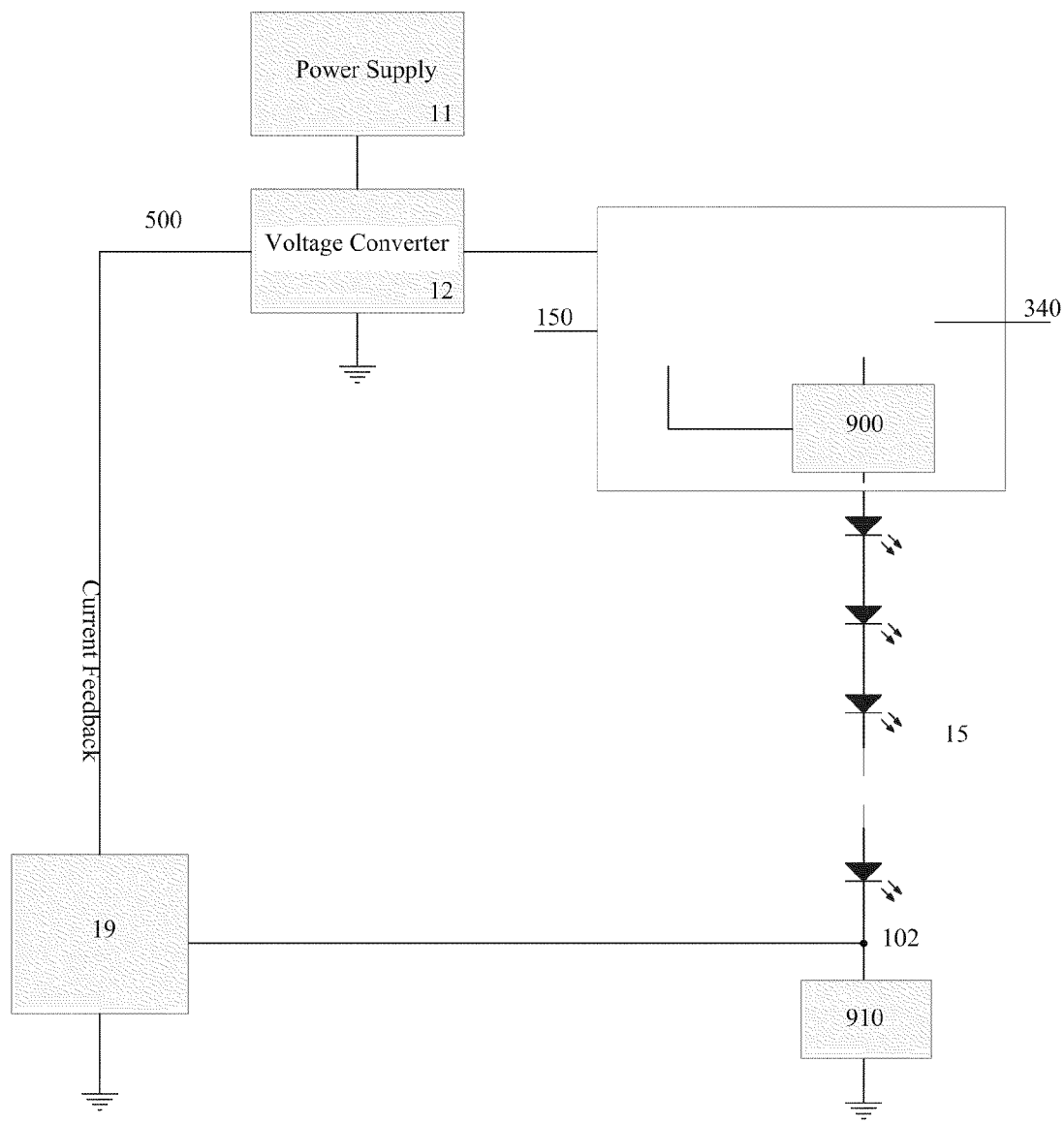
FIG. 18 illustrates a lighting system with a drive and control apparatus according to the embodiment of FIG. 16 wherein the dimming control means is positioned at the high-side of the string of one or more light-emitting elements.

FIGS. 16 and 17 illustrate embodiments of the present invention which are configured without an op amp, however additional switching components are required to replace some or all of the functionality of the op amp. Switching and sensing means 950 is responsive to a high signal 340 which can provide a means for bypassing its sensing means during high duty cycles. Furthermore during low duty cycles switching and sensing means 950 can be responsive to a low signal 340, thereby forcing current to pass through its sensing means. This functionality provided by the switching and sensing means can provide a desired level of functionality of the drive and control apparatus, without the integration of an op amp into the system, for example. FIG. 18 illustrates another embodiment of the configuration illustrated in FIG. 16, wherein the dimming control means is positioned at the high side of the string of one or more light-emitting elements.

Having particular regard to FIG. 17, for high duty cycles, switching means 46 for example a FET can be activated by signal 340 to bypass current sense resistor 43 to improve efficiency, and ensure that dimming signal 150 is directly translated as a complementary switching signal for switching means 13 to turn it hard ON and hard OFF. At lower duty cycles, for example below about 10%, switching means 46 can be deactivated thereby forcing the current to pass through the sense resistor 43. The voltage across this sense resistor 43 can be monitored by transistor 47 which can automatically reduce the effective gate signal 270 causing FET 13 to only pass a desired peak current. The level of this peak current can be set according to the ratio of the voltage drop on sense resistor 43 compared to the typical base-emitter voltage required to turn ON the transistor, for example. Therefore if the current feedback starts to diminish and the voltage level at node 101 increases sufficiently causing the load current to rise, the transistor 47 can begin to turn ON which can regulate switching means 13 thereby limiting the current through the string of one or more light-emitting elements directly. Again, there will be power losses in both switching means 13 and sense resistor 43 at low duty cycles. However as this instance may occur at low duty cycles, the average power loss can be relatively small.

Figure 19:
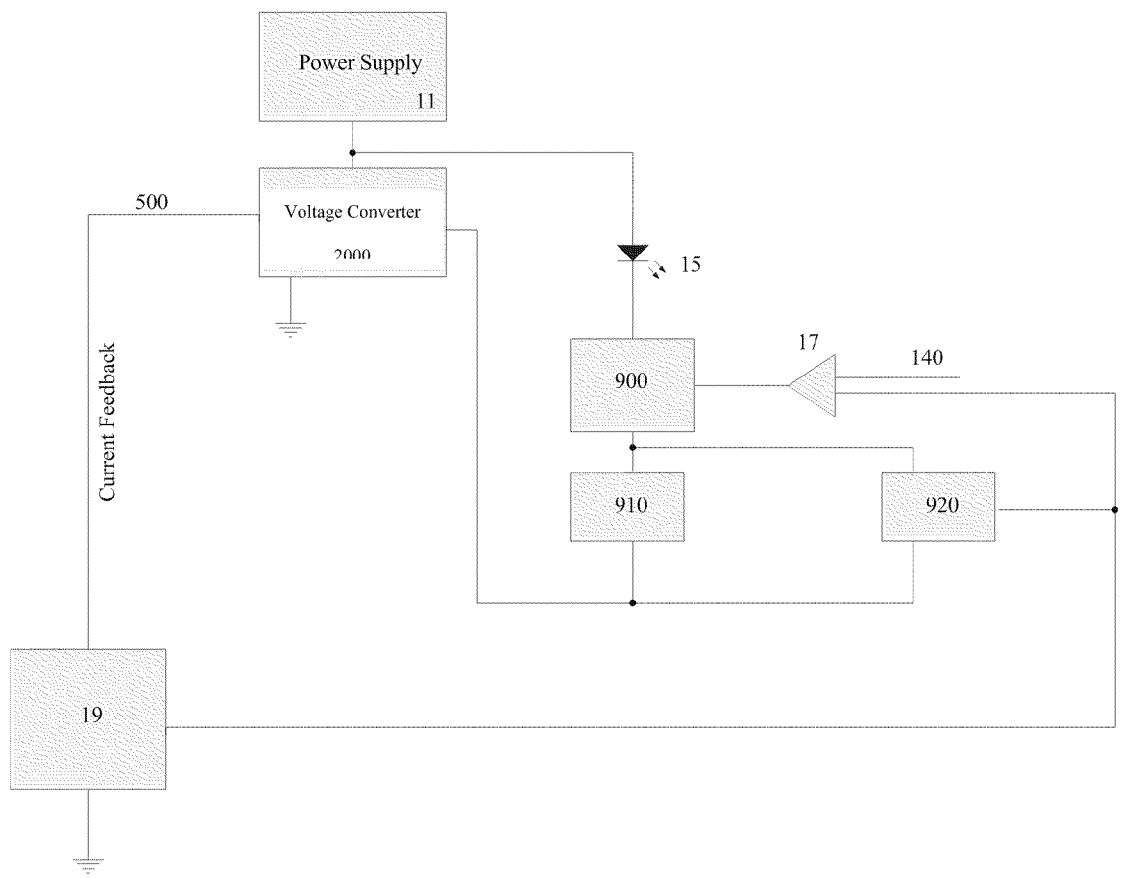
FIG. 19 illustrates a lighting system with a drive and control apparatus according to one embodiment of the present invention.

In another embodiment of the present invention, and as illustrated in FIG. 19, the lighting system with a drive and control apparatus can be configured such that the anode of one or more strings of one or more light-emitting elements can be connected to the positive rail. In this configuration, the cathode of the one or more strings of light-emitting elements is regulated and the anode of the one or more strings of light-emitting elements is connected to the positive rail. Voltage converter 2000 is configured in order that the anode of the one or more strings of light-emitting elements is connected to the positive rail. The cathode thereof is connected to switching means 900 which can be used as a switch and a linear transistor, for example. The switching means 900 is subsequently connected to current sensing means 910. The negative side of the current sensing means 910 is regulated by voltage converter 2000. Differential amplification means 920 level shifts the voltage signal across current sensing means 910 so that a voltage representative of the current flowing through current sensing means 910 is present on an output terminal thereof. Operational amplifier (op amp) 17 controls switching means 900 based on the output of the current sensing means 910 and the dimming control signal 140. The differential amplification means 920 is connected to the sample a hold circuit 19, which receives a signal indicative of the output of the current sensing means 910, wherein the sample and hold circuit 19 transmits a current feedback signal to the voltage converter 2000, thereby providing input to the voltage converter for modification of the voltage output thereby, if required.

Figure 20:
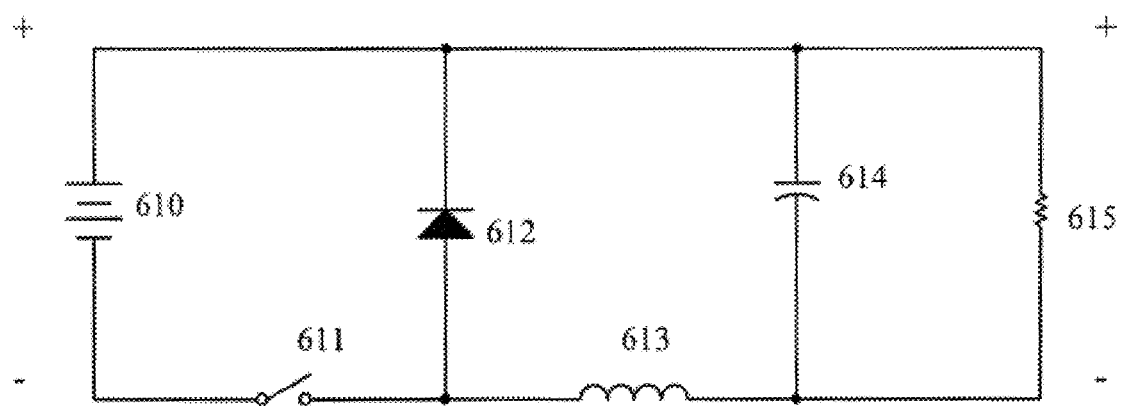
FIG. 20 illustrates a setup schematic of a voltage converter which can be configured to be integrated into a lighting system with a drive and control apparatus according to FIG. 19.

FIG. 20, illustrates a setup schematic of a voltage converter which can be configured to be integrated into a lighting system with a drive and control apparatus according to FIG. 19. Switch 611 and inductor 613 are positioned on the negative rail, wherein in this configuration the negative rail is regulated. When switch 611 is closed current flows to capacitor 614 and load 615 back through inductor 613 and charge is stored up in inductor 613. When the switch is opened, diode 612 becomes biased and acts as a short circuit. Current then flows from inductor 613 to capacitor 614 and the load 615.

Figure 21:
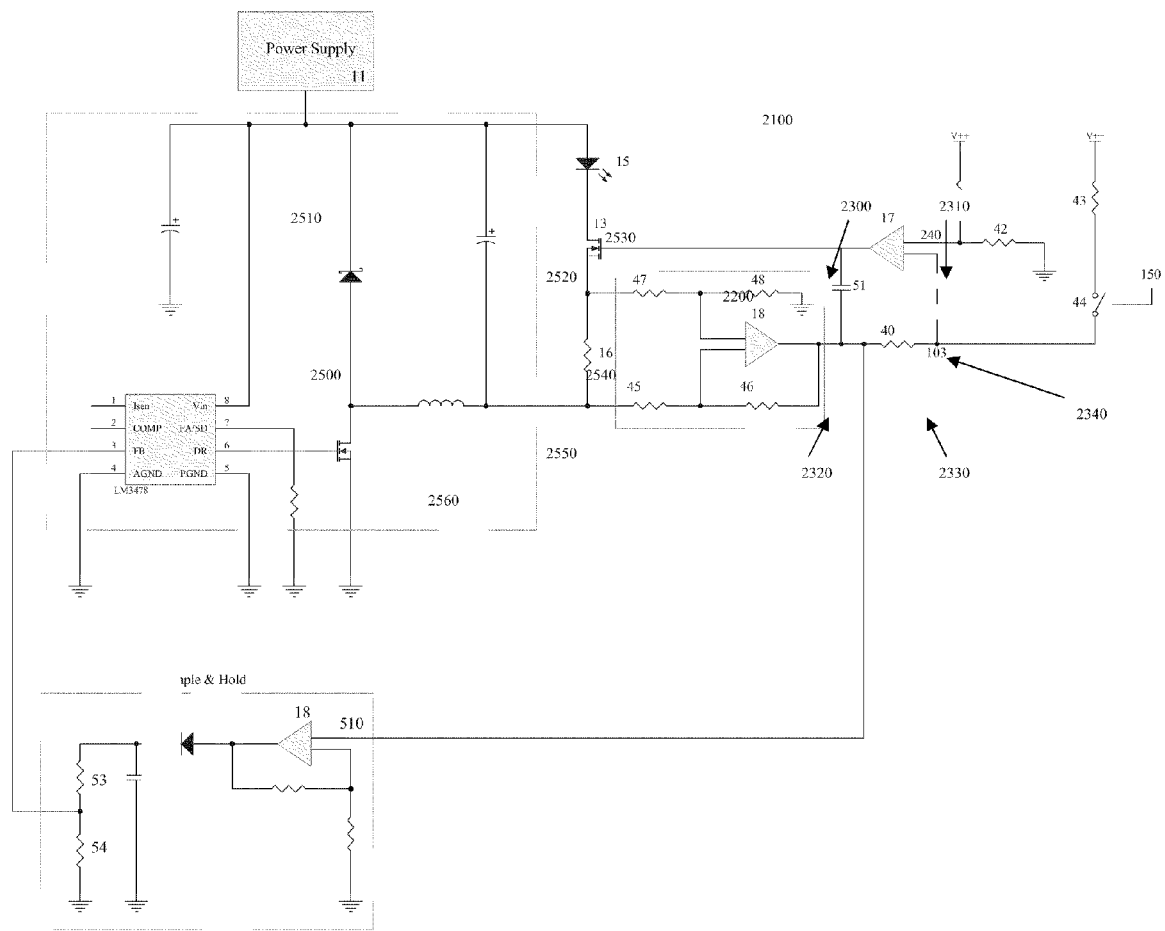
FIG. 21 illustrates a lighting system with a drive and control apparatus according to another embodiment of the present invention.

FIG. 21 illustrates another embodiment of the present invention wherein a lighting system with a drive and control apparatus is configured such that the anode of two or more strings of light-emitting elements is commonly connected to the positive rail according to an embodiment of the present invention. In this embodiment, the voltage converter comprises integrated circuit 2500, capacitors 2510 and 2530, diode 2520, for example a Schottky diode, inductor 2540, switch 2550, for example a FET switch and resistor 2560. Node 2100 and the anode of the string of one or more light-emitting elements are connected to the positive rail, and node 2200 is regulated by the voltage converter. As the cathode of the string of one or more light-emitting elements is regulated, current sensing device 16 is not connected to ground. A differential amplifier 2340 along with the associated resistors, 2300, 2310, 2320 and 2330 provide a means for the voltage across the current sensing device 16 to be referenced to ground.

With further reference to FIG. 21, a logic level switching signal 150 can be used in conjunction with switch 44 and resistor 43 to provide a means for dimming the lighting system. Signal 240 is the fixed voltage reference which is proportional to the desired peak current. A high speed switch 44 is enabled and disabled for dimming control. When switch 44 is enabled, resistors 43 and 40 act as a voltage divider which can be set to a value higher than the voltage reference produced by resistors 41 and 42 which can ensure that the op amp 17 turns switching means 13, for example a FET switch, OFF which prevents current from flowing through the string of one or more light-emitting elements 15. When switch 44 is disabled, this switch achieves a high impedance state, and the signal 103 at the inverting input of op amp 17 is representative of the current flowing through the current sensing device 16. For large duty cycles, the current feedback loop and the voltage converter can maintain the voltage level at node 2200 such that signal 103 will typically be lower than the maximum desired current level set by the voltage reference 240. Thus the op amp 17 can switch switching means 13 hard ON and hard OFF. Based on the configuration of the analog switch 44, the ON and OFF periods of the string of one or more light-emitting elements can be the complement of the logic level switching signal 150. As the duty cycle drops below a certain level, for example about 10%, and the output voltage level at node 2200 falls, if the peak current rises above a desired threshold, op amp 17 can reduce the voltage level it applies to the gate of switching means 13, and hence the switching means will be switched in a soft manner, dissipating some power to limit the peak current. However, at very low duty cycles, the total average power dissipated can still be small.

In embodiments in which multiple light-emitting element strings are driven by a single power supply, components of the feedback loop of the circuit may be combined for all or groups of light-emitting element strings or may be separate components for each light-emitting element string being driven.

It is obvious that the foregoing embodiments of the invention are exemplary and can be varied in many ways. Such variations are not to be regarded as a departure from the spirit and scope of the invention, and all such modifications, as would be obvious in the art, are intended to be included within the scope of the following claims.

We claim:

1. A drive and control apparatus for controlling current supplied to a string of one or more electronic devices, the apparatus comprising:
a voltage converter configured to receive a first magnitude voltage from a power supply, the voltage converter configured to convert the first magnitude voltage to a second magnitude voltage in response to a control signal;
a dimming control means configured to receive the second magnitude voltage and a dimming control signal, the dimming control means configured to control transmission of the second magnitude voltage to the string based on the dimming control signal, the dimming control means configured for multi-mode operation, wherein the dimming control signal is indicative of a desired mode of operation of the dimming control means, and is indicative of a duty cycle and a reference voltage;
a current sensing means in series with the string and configured to generate a feedback signal indicative of current flowing through the string; and
a feedback means electrically coupled to the voltage converter and current sensing means, the feedback means configured to receive the feedback signal and generate the control signal based on the feedback signal, the feedback means further configured to provide the control signal to the voltage converter.

2. The drive and control apparatus according to claim 1, wherein the current sensing means is a fixed resistor, variable resistor or inductor.

3. The drive and control apparatus according to claim 1, wherein the feedback means comprises a sample and hold circuit.

4. The drive and control apparatus according to claim 1, wherein the string has an anode and a cathode and wherein the voltage converter is configured to enable electrical connection of the anode of the string between the voltage converter and the power supply.

5. The drive and control apparatus according to claim 1, wherein said string has a high end and a low end, the dimming control means electrically connected to the low end of the string.

6. The drive and control apparatus according to claim 1, wherein said string has a high end and a low end, the dimming and control means electrically connected to the high end of the string.

7. The drive and control apparatus according to claim 1, wherein the voltage converter is a DC-DC converter.

8. The drive and control apparatus according to claim 7, wherein the voltage converter is selected from the group comprising buck converter, boost converter, buck-boost converter, cuk converter and fly-back converter.

9. The drive and control apparatus according to claim 1, wherein the dimming control means is configured for dual mode operation.

10. The drive and control apparatus according to claim 9, wherein the dimming control means is configured to operate in a first mode when the dimming control signal is indicative of a duty cycle above a predetermined threshold.

11. The drive and control apparatus according to claim 10, wherein the dimming control means is configured to operate in a second mode when the dimming control signal is indicative of a duty cycle below a predetermined threshold.

12. The drive and control apparatus according to claim 11, wherein the predetermined threshold is between 5% and 30%.

13. The drive and control apparatus according to claim 12, wherein the predetermined threshold is 10%.

14. A drive and control apparatus for controlling current supplied to a string of one or more electronic devices, the apparatus comprising:
a voltage converter configured to receive a first magnitude voltage from a power supply, and to convert the first magnitude voltage to a second magnitude voltage in response to a control signal;
a dimming control circuit configured to receive the second magnitude voltage and a dimming control signal, and to control transmission of the second magnitude voltage to the string based on the dimming control signal, the dimming control circuit being configured for multi-mode operation, wherein the dimming control signal is indicative of a desired mode of operation of the dimming control means;
a current sensing circuit connected in series with the string and configured to generate a feedback signal indicative of current flowing through the string; and
a sample and hold circuit electrically coupled to the voltage converter and the current sensing circuit, the sample and hold circuit being configured to receive the feedback signal and generate the control signal based on the feedback signal, and to provide the control signal to the voltage converter.

15. The drive and control apparatus according to claim 14, wherein the dimming control signal is indicative of a duty cycle and wherein the dimming control means is further responsive to a voltage reference signal received thereby.

16. The drive and control apparatus according to claim 14, wherein the dimming control circuit is configured for dual mode operation.

17. The drive and control apparatus according to claim 16, wherein the dimming control circuit is configured to operate in a first mode when the dimming control signal is indicative of a duty cycle above a predetermined threshold.

18. The drive and control apparatus according to claim 17, wherein the dimming control circuit is configured to operate in a second mode when the dimming control signal is indicative of a duty cycle below a predetermined threshold.

19. The drive and control apparatus according to claim 18, wherein the predetermined threshold is between 5% and 30%.

20. A drive and control apparatus for controlling current supplied to a string of one or more electronic devices, the apparatus comprising:
a voltage converter configured to receive a first magnitude voltage from a power supply, and to convert the first magnitude voltage to a second magnitude voltage in response to a control signal;

a current sensing circuit connected in series with the string and configured to generate a feedback signal indicative of current flowing through the string;

a dimming control circuit configured to receive the second magnitude voltage and a dimming control signal, and to control transmission of the second magnitude voltage to the string based on the dimming control signal, the dimming control circuit being configured for multi-mode operation, wherein the dimming control signal is indicative of a desired mode of operation, the dimming control circuit comprising:

an operational amplifier configured to receive the dimming control signal and the feedback signal, and to output a switch control signal corresponding to the desired mode of operation, and switching means connected in series with the string and the current sensing circuit, the switching means being configured to selectively activate the string in response to the switch control signal output by the operational amplifier; and a feedback circuit electrically coupled to the voltage converter and the current sensing circuit, the feedback circuit being configured to receive the feedback signal and generate the control signal based on the feedback signal, and to provide the control signal to the voltage converter.

* * * * *